United States Patent
Hande et al.

(10) Patent No.: US 12,513,775 B2
(45) Date of Patent: Dec. 30, 2025

(54) CONNECTED MODE DISCONTINUOUS RECEPTION SETTINGS FOR PERIODIC TRAFFIC WITH JITTER

(71) Applicant: QUALCOMM Incorporated, San Diego, CA (US)

(72) Inventors: Prashanth Haridas Hande, San Diego, CA (US); Marcelo Schiocchet, San Diego, CA (US); Chih-Ping Li, San Diego, CA (US); Hyun Yong Lee, San Diego, CA (US); Yuchul Kim, San Diego, CA (US); Mickael Mondet, Louannec (FR); Vinay Melkote Krishnaprasad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 17/942,990

(22) Filed: Sep. 12, 2022

(65) Prior Publication Data

US 2024/0090076 A1   Mar. 14, 2024

(51) Int. Cl.
*H04W 76/28* (2018.01)
*H04L 41/142* (2022.01)

(52) U.S. Cl.
CPC .......... *H04W 76/28* (2018.02); *H04L 41/142* (2013.01)

(58) Field of Classification Search
CPC .................. H04W 76/28; H04L 41/14–149
See application file for complete search history.

(56) References Cited

U.S. PATENT DOCUMENTS

| | | | |
|---|---|---|---|
| 2004/0203871 A1* | 10/2004 | Geier | H04W 64/00 455/456.1 |
| 2006/0083168 A1* | 4/2006 | Prakash | H04L 1/205 370/230 |

(Continued)

OTHER PUBLICATIONS

Interdigital Inc: "Discussion on XR-Specific Power Saving", 3GPP RAN WG2 Meeting #119-e, R2-2207490, 3rd Generation Partnership Project, Mobile Competence Centre, 650, Route Des Lucioles, F-06921 Sophia-Antipolis Cedex, France, vol. RAN WG2, No. Electronic, Aug. 17, 2022-Aug. 29, 2022, Aug. 10, 2022, XP052260810, 5 pages, Section 2.1 Enhancements for adapting CDRX parameters, Section 2.2 Enhancements for changing CRDX configurations.

(Continued)

*Primary Examiner* — Brendan Y Higa
(74) *Attorney, Agent, or Firm* — Holland & Hart LLP

(57) ABSTRACT

Methods, systems, and devices for wireless communications are described. A network entity may account for jitter in communications with a user equipment (UE) by adjusting connected mode discontinuous reception (CDRX) configuration parameters for the UE based on estimated downlink traffic arrival times. For a downlink traffic burst, the network entity may estimate a traffic arrival offset based on determining a traffic periodicity, an estimated arrival time associated with one or more packets of a traffic burst, and at least one jitter parameter. The jitter parameter may represent an uncertainty in the arrival time of the traffic burst. The network entity may select a CDRX offset value based on the estimated traffic arrival offset. The network entity may transmit (e.g., to a UE, such as an extended reality (XR) device) a message indicating the CDRX offset value, for example, as part of a CDRX configuration.

30 Claims, 16 Drawing Sheets

(56) References Cited

U.S. PATENT DOCUMENTS

| | | | |
|---|---|---|---|
| 2012/0008641 A1* | 1/2012 | Stoica | H04L 47/225 370/465 |
| 2020/0383004 A1* | 12/2020 | Hande | H04W 24/08 |
| 2023/0065594 A1* | 3/2023 | Chan | H04W 28/10 |
| 2023/0156524 A1* | 5/2023 | Akl | H04W 52/0216 370/328 |
| 2023/0300945 A1* | 9/2023 | Maleki | H04W 52/0216 370/329 |
| 2023/0403758 A1* | 12/2023 | Lee | H04L 1/1642 |

OTHER PUBLICATIONS

International Search Report and Written Opinion—PCT/US2023/072076—ISA/EPO—Oct. 27, 2023.
Qualcomm Incorporated: "Potential Enhancements for XR", 3GPP TSG RAN WG1 #107-e, R1-2112245, Mobile Competence Centre, 650, Route Des Lucioles, F-06921, Sophia-Antipolis Cedex, France, vol. RAN WG1, No. e-Meeting, Nov. 11, 2021-Nov. 19, 2021, Nov. 6, 2021, pp. 1-20, XP052075351, p. 4,14, Sec 2.6, p. 6, Sec 3.4, p. 12-13, Sec 3.8, p. 17-18, Sec 2.1 CDRX Enhancement, Sec 2.2 Enhancements for Jitter handling, Sec 2.3 Enhancements to L1-based Signaling to be Further Closer to "Genie" Performance, Sec 2.4 UL&DL Alignment.
Qualcomm Incorporated: "Power Saving Techniques for XR", 3GPP TSG RAN WG1 #109-e, R1-2205054, 3rd Generation Partnership Project (3GPP), Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, pp. 1-26, XP052203902, p. 4-5, Section 2.1 Enhanced CRDX, Section 2.2 Dynamic C-DRX Parameter Adaptation.
Vivo: "Discussion on XR Specific Power Saving Enhancements", 3GPP TSG RAN WG1 #110, R1-2207860, (Revision of R1-2206061), 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 28, 2022, XP052275791, 17 pages, Section 3.1 RRC signaling based-DRX enhancement, Section 4.2. PDCCH monitoring adaptation enhancement based on the predictable jitter, Section 4.3 Low power-wake up signal (LP-WUS).

* cited by examiner

CONNECTED MODE DISCONTINUOUS RECEPTION SETTINGS FOR PERIODIC TRAFFIC WITH JITTER

TECHNICAL FIELD

The following relates to wireless communications, including connected mode discontinuous reception (CDRX) settings for periodic traffic with jitter.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communication systems may support Extended Reality (XR) applications, which may include virtual reality (VR), augmented reality (AR), mixed reality (MR), or a combination thereof. Further, an XR system may implement or be an example of a SplitXR system where XR computations are split between an XR device and an XR server.

SUMMARY

The described techniques relate to improved methods, systems, devices, and apparatuses that support connected mode discontinuous reception (CDRX) settings for periodic traffic with jitter. For example, the described techniques provide for a network entity to account for jitter by adjusting CDRX configuration parameters based on estimated traffic arrival times. The network entity may estimate a traffic arrival offset based on determining a traffic periodicity, an estimated arrival time associated with one or more packets of a traffic burst, and at least one jitter parameter. The jitter parameter may represent an uncertainty in the arrival time of the traffic burst. The network entity may select a CDRX offset value based on the estimated traffic arrival offset. The network entity may transmit (e.g., to a user equipment (UE), such as an extended reality (XR) device) a message indicating the CDRX offset value, for example, as part of a CDRX configuration.

The UE may operate in a CDRX mode according to the CDRX offset value (e.g., and the CDRX configuration). In some examples, the network entity may dynamically update the CDRX offset value (e.g., based on an updated estimate of the traffic arrival offset) and may indicate the updated CDRX offset value to the UE. Additionally, or alternatively, the UE may determine or otherwise calculate a CDRX offset value and may transmit, to the network entity, a message indicating the CDRX offset value. The network entity may select the CDRX offset value for the CDRX configuration based on the indication received from the UE.

A method for wireless communications at a network entity is described. The method may include determining a traffic periodicity associated with one or more packets of a traffic burst based on a timing parameter associated with the one or more packets of the traffic burst, estimating a traffic arrival offset value based on the traffic periodicity, an estimated arrival time associated with the one or more packets of the traffic burst, and at least one jitter parameter, selecting a CDRX offset value based on the estimated traffic arrival offset value, and transmitting, to a UE, a message indicating the CDRX offset value for the UE to operate in a CDRX mode according to the CDRX offset value.

An apparatus for wireless communications at a network entity is described. The apparatus may include at least one processor and memory coupled (e.g., operatively, communicatively, functionally, electronically, or electrically) to the processor. The memory may store instructions executable by the at least one processor to cause the network entity to determine a traffic periodicity associated with one or more packets of a traffic burst based on a timing parameter associated with the one or more packets of the traffic burst, estimate a traffic arrival offset value based on the traffic periodicity, an estimated arrival time associated with the one or more packets of the traffic burst, and at least one jitter parameter, select a connected mode discontinuous reception (CDRX) offset value based on the estimated traffic arrival offset value, and transmit, to a UE, a message indicating the CDRX offset value for the UE to operate in a CDRX mode according to the CDRX offset value.

Another apparatus for wireless communications at a network entity is described. The apparatus may include means for determining a traffic periodicity associated with one or more packets of a traffic burst based on a timing parameter associated with the one or more packets of the traffic burst, means for estimating a traffic arrival offset value based on the traffic periodicity, an estimated arrival time associated with the one or more packets of the traffic burst, and at least one jitter parameter, means for selecting a CDRX offset value based on the estimated traffic arrival offset value, and means for transmitting, to a UE, a message indicating the CDRX offset value for the UE to operate in a CDRX mode according to the CDRX offset value.

A non-transitory computer-readable medium storing code for wireless communications at a network entity is described. The code may include instructions executable by at least one processor to determine a traffic periodicity associated with one or more packets of a traffic burst based on a timing parameter associated with the one or more packets of the traffic burst, estimate a traffic arrival offset value based on the traffic periodicity, an estimated arrival time associated with the one or more packets of the traffic burst, and at least one jitter parameter, select a CDRX offset value based on the estimated traffic arrival offset value, and transmit, to a UE, a message indicating the CDRX offset value for the UE to operate in a CDRX mode according to the CDRX offset value.

Some examples of the method, apparatuses, and non-transitory computer-readable medium described herein may further include operations, features, means, or instructions for determining the estimated arrival time associated with the one or more packets of the traffic burst based on a set of traffic bursts, a quantity of traffic bursts of the set of traffic bursts, a first arrival time for a first traffic burst of the set of traffic bursts, the traffic periodicity, or a combination thereof.

In some examples of the method, apparatuses, and non-transitory computer-readable medium described herein, estimating the traffic arrival offset value may include operations, features, means, or instructions for estimating the traffic arrival offset value based on the earliest arrival time and an arrival time of the one or more packets of the traffic burst.

In some examples of the method, apparatuses, and non-transitory computer-readable medium described herein, estimating the traffic arrival offset value may include operations, features, means, or instructions for estimating the traffic arrival offset value based on the earliest arrival time, the percentage value, and an arrival time of the one or more packets of the traffic burst.

In some examples of the method, apparatuses, and non-transitory computer-readable medium described herein, the percentage value may be based on a quality of service for a communication link between the network entity and the UE, a packet delay budget, or a combination thereof.

In some examples of the method, apparatuses, and non-transitory computer-readable medium described herein, estimating the traffic arrival offset value may include operations, features, means, or instructions for estimating the traffic arrival offset value based on the at least one jitter parameter and a set of estimated arrival times for a set of traffic bursts including the traffic burst.

In some examples of the method, apparatuses, and non-transitory computer-readable medium described herein, the at least one jitter parameter includes a set of earliest arrival times associated with the set of traffic bursts.

In some examples of the method, apparatuses, and non-transitory computer-readable medium described herein, the at least one jitter parameter includes a set of earliest arrival times associated with the set of traffic bursts and a percentage value of a difference between the set of estimated arrival times and a set of nominal arrival times for the set of traffic bursts.

Some examples of the method, apparatuses, and non-transitory computer-readable medium described herein may further include operations, features, means, or instructions for updating the estimated traffic arrival offset value based on a second set of estimated arrival times for a second set of traffic bursts and updating the CDRX offset value based on the estimated traffic arrival offset value.

Some examples of the method, apparatuses, and non-transitory computer-readable medium described herein may further include operations, features, means, or instructions for transmitting, to the UE, a second message indicating the updated CDRX offset value.

Some examples of the method, apparatuses, and non-transitory computer-readable medium described herein may further include operations, features, means, or instructions for transmitting the second message based on a difference between the CDRX offset value and the updated CDRX offset value satisfying a threshold.

In some examples of the method, apparatuses, and non-transitory computer-readable medium described herein, the second message includes a radio resource control (RRC) message, a media access control (MAC) control element (MAC-CE), or a wake-up signal for the UE.

In some examples of the method, apparatuses, and non-transitory computer-readable medium described herein, selecting the CDRX offset value may include operations, features, means, or instructions for selecting the CDRX offset value to be equal to the estimated traffic arrival offset value plus a UE specific offset.

In some examples of the method, apparatuses, and non-transitory computer-readable medium described herein, the UE specific offset may be based on scheduling the traffic burst for the UE.

In some examples of the method, apparatuses, and non-transitory computer-readable medium described herein, selecting the CDRX value may include operations, features, means, or instructions for selecting the CDRX offset value to be equal to the estimated traffic arrival offset value.

Some examples of the method, apparatuses, and non-transitory computer-readable medium described herein may further include operations, features, means, or instructions for selecting a CDRX duty cycle periodicity to be equal to the determined traffic periodicity and transmitting, in the message, an indication of the CDRX duty cycle periodicity.

In some examples of the method, apparatuses, and non-transitory computer-readable medium described herein, transmitting the message indicating the CDRX offset value may include operations, features, means, or instructions for transmitting an indication of a set of CDRX parameters of a CDRX configuration for the CDRX mode, the set of CDRX parameters including the CDRX offset value.

In some examples of the method, apparatuses, and non-transitory computer-readable medium described herein, the timing parameter includes a rendering frames per second value or an average downlink traffic arrival time for two or more traffic bursts.

A method for wireless communication at a UE is described. The method may include determining a traffic periodicity associated with one or more packets of a traffic burst based on a timing parameter associated with the one or more packets of the traffic burst, estimating a traffic arrival offset value based on the traffic periodicity, an estimated arrival time associated with the one or more packets of the traffic burst, and at least one jitter parameter, selecting a CDRX offset value based on the estimated traffic arrival offset value, and transmitting, to a network entity, a message indicating the CDRX offset value for the UE to operate in a CDRX mode according to the CDRX offset value.

An apparatus for wireless communication at a UE is described. The apparatus may include at least one processor and memory coupled (e.g., operatively, communicatively, functionally, electronically, or electrically) to the processor. The memory may store instructions executable by the at least one processor to cause the UE to determine a traffic periodicity associated with one or more packets of a traffic burst based on a timing parameter associated with the one or more packets of the traffic burst, estimate a traffic arrival offset value based on the traffic periodicity, an estimated arrival time associated with the one or more packets of the traffic burst, and at least one jitter parameter, select a CDRX offset value based on the estimated traffic arrival offset value, and transmit, to a network entity, a message indicating the CDRX offset value for the UE to operate in a CDRX mode according to the CDRX offset value.

Another apparatus for wireless communication at a UE is described. The apparatus may include means for determining a traffic periodicity associated with one or more packets of a traffic burst based on a timing parameter associated with the one or more packets of the traffic burst, means for estimating a traffic arrival offset value based on the traffic periodicity, an estimated arrival time associated with the one or more packets of the traffic burst, and at least one jitter parameter, means for selecting a CDRX offset value based on the estimated traffic arrival offset value, and means for transmitting, to a network entity, a message indicating the CDRX offset value for the UE to operate in a CDRX mode according to the CDRX offset value.

A non-transitory computer-readable medium storing code for wireless communication at a UE is described. The code may include instructions executable by at least one processor to determine a traffic periodicity associated with one or more packets of a traffic burst based on a timing parameter associated with the one or more packets of the traffic burst, estimate a traffic arrival offset value based on the traffic periodicity, an estimated arrival time associated with the one or more packets of the traffic burst, and at least one jitter parameter, select a CDRX offset value based on the estimated traffic arrival offset value, and transmit, to a network entity, a message indicating the CDRX offset value for the UE to operate in a CDRX mode according to the CDRX offset value.

Some examples of the method, apparatuses, and non-transitory computer-readable medium described herein may further include operations, features, means, or instructions for determining the estimated arrival time associated with the one or more packets of the traffic burst based on a set of traffic bursts, a quantity of traffic bursts of the set of traffic bursts, a first arrival time for a first traffic burst of the set of traffic bursts, and the traffic periodicity.

In some examples of the method, apparatuses, and non-transitory computer-readable medium described herein, the estimated arrival time, the estimated traffic arrival offset value, and the traffic periodicity may be associated with an arrival of the one or more packets of the traffic burst at a server.

In some examples of the method, apparatuses, and non-transitory computer-readable medium described herein, estimating the traffic arrival offset value may include operations, features, means, or instructions for estimating the traffic arrival offset value based on the earliest arrival time and an arrival time of the one or more packets of the traffic burst.

In some examples of the method, apparatuses, and non-transitory computer-readable medium described herein, estimating the traffic arrival offset value may include operations, features, means, or instructions for estimating the traffic arrival offset value based on the earliest arrival time, the percentage value, and an arrival time of the one or more packets of the traffic burst.

In some examples of the method, apparatuses, and non-transitory computer-readable medium described herein, the percentage value may be based on a quality of service for a communication link between the network entity and the UE, a packet delay budget, or a combination thereof.

In some examples of the method, apparatuses, and non-transitory computer-readable medium described herein, estimating the traffic arrival offset value may include operations, features, means, or instructions for estimating the traffic arrival offset value based on the at least one jitter parameter and a set of estimated arrival times for a set of traffic bursts including the traffic burst.

In some examples of the method, apparatuses, and non-transitory computer-readable medium described herein, the at least one jitter parameter includes a set of earliest arrival times associated with the set of traffic bursts.

In some examples of the method, apparatuses, and non-transitory computer-readable medium described herein, the at least one jitter parameter includes a set of earliest arrival times associated with the set of traffic bursts and a percentage value of a difference between the set of estimated arrival times and a set of nominal arrival times for the set of traffic bursts.

Some examples of the method, apparatuses, and non-transitory computer-readable medium described herein may further include operations, features, means, or instructions for receiving a second message indicating an updated CDRX offset value and operating in the CDRX mode according to the updated CDRX offset value.

In some examples of the method, apparatuses, and non-transitory computer-readable medium described herein, the second message includes an RRC message, a MAC-CE, or a wake-up signal for the UE.

In some examples of the method, apparatuses, and non-transitory computer-readable medium described herein, selecting the CDRX offset value may include operations, features, means, or instructions for selecting the CDRX offset value to be equal to the estimated traffic arrival offset value.

Some examples of the method, apparatuses, and non-transitory computer-readable medium described herein may further include operations, features, means, or instructions for operating in the CDRX mode according to a CDRX duty cycle periodicity that may be equal to the determined traffic periodicity.

Some examples of the method, apparatuses, and non-transitory computer-readable medium described herein may further include operations, features, means, or instructions for receiving an indication of a set of CDRX parameters of a CDRX configuration for the CDRX mode, the set of CDRX parameters including the CDRX offset value.

In some examples of the method, apparatuses, and non-transitory computer-readable medium described herein, the timing parameter includes a rendering frames per second value or an average downlink traffic arrival time for two or more traffic bursts.

DETAILED DESCRIPTION

Figure 1:
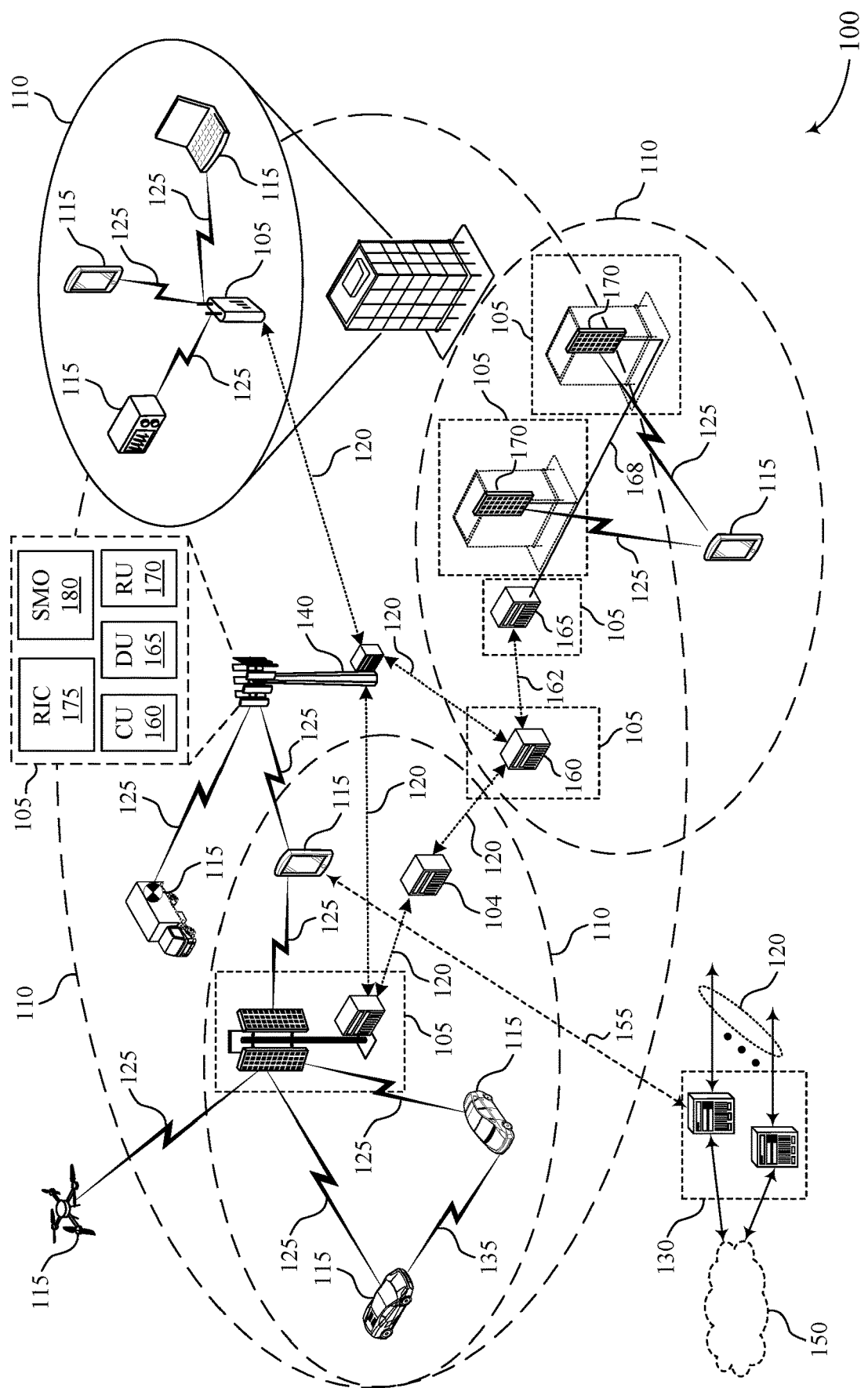
FIG. 1 illustrates an example of a wireless communications system that supports connected mode discontinuous reception (CDRX) settings for periodic traffic with jitter in accordance with one or more aspects of the present disclosure.

Extended reality (XR) data in a wireless communications system may include virtual reality (VR) data, augmented reality (AR) data, mixed reality (MR) data, and other types of data which may be associated with high reliability and low latency transmissions. In some cases, multimedia devices that support XR data (e.g., XR devices) may use a split implementation such as a SplitXR implementation. SplitXR may utilize computational resources on an XR server to support an XR device by splitting related multimedia XR computations, such as rendering video frames, between the XR server and the XR device. In some examples, a network entity may relay XR data from the XR server to the XR device. For example, the network entity may transmit SplitXR rendered video frame data to user equipments (UEs) (e.g., XR users, XR devices, or other devices that support XR communications) in a downlink transmission. In such examples, jitter may occur in the downlink transmission, e.g., due to render time, encoding time, or Real-time Transport Protocol (RTP) packetization time.

In some wireless communication systems, a UE (e.g., an XR device) may operate according to a connected mode discontinuous reception (CDRX) configuration, which may support reduced power consumption at the UE. The CDRX configuration may include a CDRX on-duration/off-duration cycle with a fixed periodicity that enables the UE to sleep (e.g., when there is no traffic between the UE and a network entity) and wake up during a periodic window (e.g., a wake-up window, a CDRX window) to receive traffic (e.g., downlink traffic) arriving from the network entity. The network entity may set parameters of the CDRX configuration for the UE. For example, the network entity may set the periodicity to match the traffic arrival pattern so that the traffic arrival falls within a wake-up window of the UE. However, in XR operations (e.g., SplitXR), due to jitter in downlink transmissions, traffic may not arrive exactly according to the periodicity and the UE may wake up too early or too late to receive a downlink transmission, which may increase latency and power consumption at the UE.

Techniques described herein are provided for estimating a CDRX offset for adjusting the wake-up window to reduce the impact of the jitter on the UE, which may improve latency, power consumption, and quality and reliability of SplitXR downlink transmissions. A UE may operate according to a CDRX configuration to receive periodic downlink traffic (e.g., XR data from an XR server). For example, the UE may receive downlink traffic according to a traffic periodicity that is equal to a frames per second (fps) value associated with XR data. A network entity may configure the UE with the CDRX configuration, and may account for variation in traffic arrival times of the periodic downlink traffic resulting from jitter by calculating a traffic arrival offset value. Based on the traffic arrival offset value, the network entity may calculate a CDRX offset value, and may adjust a wake-up window of the CDRX configuration for the UE accordingly.

For example, the network entity may calculate an estimated arrival time as the difference between an actual arrival time of a packet at the UE and a nominal arrival time, where the nominal arrival time corresponds to an arrival time as predicted by a periodic pattern (e.g., a periodic pattern without jitter). The network entity may calculate the CDRX offset value based on a minimum phase of the estimated arrival time, which may correspond to an earliest arrival time of a packet at the UE. Alternatively, the network entity may calculate the CDRX offset value based on the phase value (e.g., a minimum phase) and a percentage of an estimated jitter value. Here, the estimated jitter value may correspond to a difference between the estimated arrival time and the nominal arrival time. In another example, the network entity may dynamically calculate and update the CDRX offset value over time. For example, the CDRX offset value may be calculated as a function of a set of estimated arrival times for a set of packets. This function may correspond to a minimum estimated arrival time of the set of estimated arrival times or to the minimum estimated arrival time and a percentage value of an estimated jitter value associated with the set of estimated arrival times. In such examples, the network entity may update the CDRX offset value over time by recalculating a CXRX offset value using a different set of packets. The network entity may indicate the updated CDRX offset value to the UE.

In some cases, the computations to determine the CDRX offset value may be performed by the network entity or the UE. For example, the UE may determine a CDRX offset value and may transmit an indication of the CDRX value to the network entity. The UE may request that the network entity utilize the indicated CDRX value in a CDRX configuration for the UE.

Aspects of the disclosure are initially described in the context of wireless communications systems. Aspects of the disclosure are then discussed with reference to a signaling diagram and a process flow. Aspects of the disclosure are further illustrated by and described with reference to apparatus diagrams, system diagrams, and flowcharts that relate to connected mode discontinuous reception settings for periodic traffic with jitter.

FIG. 1 illustrates an example of a wireless communications system 100 that supports connected mode discontinuous reception settings for periodic traffic with jitter in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support connected mode discontinuous reception settings for periodic traffic with jitter as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support XR devices. For example, a UE 115 may be an XR device, which may include a virtual reality (VR) device, an augmented reality device (AR), or a mixed reality (MR) device, where an MR device may include a combination of aspects from both VR devices and AR devices. In some cases, XR devices may use a SplitXR implementation. SplitXR may utilize additional computational resources on an XR server (e.g., in communication with a network entity 105) to support an XR device (e.g., a UE 115) by splitting multimedia XR computations between the XR server and the XR device. XR transmissions may have a low latency and may include delay-sensitive processes at a UE 115 (e.g., to improve quality of user experience). XR transmissions may also include high data throughput (e.g., high data rate) which may consume a large amount of power. For example, a network entity 105 may transmit large data packets, such as video frames, to a UE 115.

Further, a UE 115 in some cases may be configured with a DRX configuration, such as a CDRX configuration, in which the UE 115 transitions to a power-saving sleep state between active times in which the UE 115 monitors for communications from the network entity 105 (e.g., may monitor a physical downlink control channel (PDCCH) for one or more transmissions). An active time may be referred to as a CDRX window. Additionally, or alternatively, a start location (e.g., start time) of an active time may be indicated by an offset value. The offset value may indicate a slot or subframe at which the active time begins. The UE 115 may be configured with a CDRX duty cycle having a CDRX periodicity, such that the UE 115 wakes during CDRX windows at intervals determined by the CDRX periodicity. In some examples, an active time may include an ON duration, may be extended by an inactivity timer, or both. In XR systems, a UE 115 (e.g., an XR device) may operate according to a CDRX configuration to receive XR traffic during CDRX windows, which may enable the UE 115 to conserve power and provide a reliable user experience.

XR traffic may include one or more data flows. For example, a network entity 105 may transmit two data flows. In some examples, each data flow may have different configurations. For example, each data flow may have a different period and other varying characteristics, and may be independent from one another. In some cases, a first data flow may carry video data, while a second data flow may carry audio data. By way of another example, for XR video data, the first data flow may carry video data for a left eye (e.g., a first portion of video data) while the second data flow may carry video data for a right eye (e.g., a second portion of video data) for an XR device.

In some examples, XR communications may include one or more traffic bursts. For example, a network entity 105 may transmit one or more data packets in an XR traffic burst at the beginning of one or more CDRX cycles in periodic transmissions. In some examples, each XR traffic burst may include variability in number and size of packets per burst. For example, one XR traffic burst at the beginning of a first CDRX cycle may have three data packets of shorter lengths, whereas an XR traffic burst at the beginning of a second CDRX cycle after the first cycle may have two data packets of larger lengths. In some cases, the XR traffic may be transmitted according to non-integer or integer periods. For example, the network entity 105 may transmit XR data at $\frac{1}{60}$ frames per second (fps), with a 16.67 ms period, or at $\frac{1}{120}$ fps, with a 8.33 ms period.

In some cases, XR communications may include a small packet delay budget (PDB). For example, if a UE 115 misses reception of data for one or more video frames (e.g., due to delays in processing, jitter, or tempo mismatch), after an amount of time defined by the PDB, the UE 115 may discard data for one or more video frames after the PDB. In some cases, the network entity 105 may decide to not transmit data for one or more video frames after the time defined by the PDB. In some cases, violating a PDB may affect latency in communications, or may adversely affect user experience due to missing one or more video frames.

In some examples, jitter may be introduced in XR communications, causing arrival times of XR traffic to vary. For example, an XR traffic burst expected to arrive at the start of a CDRX cycle may arrive late (e.g., one or more ms after the start of the CDRX cycle). Additionally, or alternatively, jitter may cause an XR traffic burst to arrive before the start of a CDRX cycle or after the end of a CDRX cycle. In some examples, jitter may be caused by processing at the network entity 105, at the XR server, interference, delays, and other factors. For example, some XR processing applications may depend on the XR traffic to be rendered or transmitted, such as two-dimensional (2D) media content that is based on user input or user data. Thus, such applications (e.g., rendering, encoding, or the like) at the XR server may take more time than expected, delaying transmission of an XR traffic burst. Additionally, or alternatively, the regular or periodic pattern of XR traffic may have a periodicity based on the associated fps to support reliable user experience at the UE 115, but the periodicity of the XR traffic may not align with a periodicity of the CDRX cycle (e.g., the CDRX duty cycle). This may cause a tempo mismatch, where the UE 115 and the XR traffic will be out of sync at one or more times.

In general, jitter may degrade performance at the UE 115, particularly when traffic (e.g., XR traffic) relies on accurate timing for reliable user experience. For example, when jitter causes XR traffic to arrive before or after a CDRX window, the UE 115 may be in a sleep state and may fail to receive the XR traffic, which may increase latency. If the UE 115 is configured to wake more frequently (e.g., to ensure reception of the XR traffic), however, the UE 115 may consume significant power. According to the techniques described herein, the UE 115 may be configured with a CDRX offset value that is based on estimates of traffic arrival times that account for jitter, such that the UE 115 may receive traffic (e.g., XR traffic) with improved reliability and consistency while maintaining appropriate power consumption levels. For example, the network entity 105 configuring the UE 115 (e.g., with a CDRX configuration) may account for variation in traffic arrival times resulting from jitter by calculating a traffic arrival offset value, which may be based on estimated traffic arrival times associated with one or more traffic bursts and one or more jitter parameters corresponding to the one or more traffic bursts. Using the traffic arrival offset value, the network entity 105 may determine a CDRX offset value for the UE 115 that enables the UE 115 to reduce latency and power consumption.

In some cases, the computations to determine the CDRX offset value may be performed by the network entity 105 or the UE 115. For example, the UE 115 may calculate a CDRX offset value and may transmit an indication of the CDRX value to the network entity 105. The UE 115 may request that the network entity 105 utilize the indicated CDRX value in a CDRX configuration for the UE 115.

Figure 2:
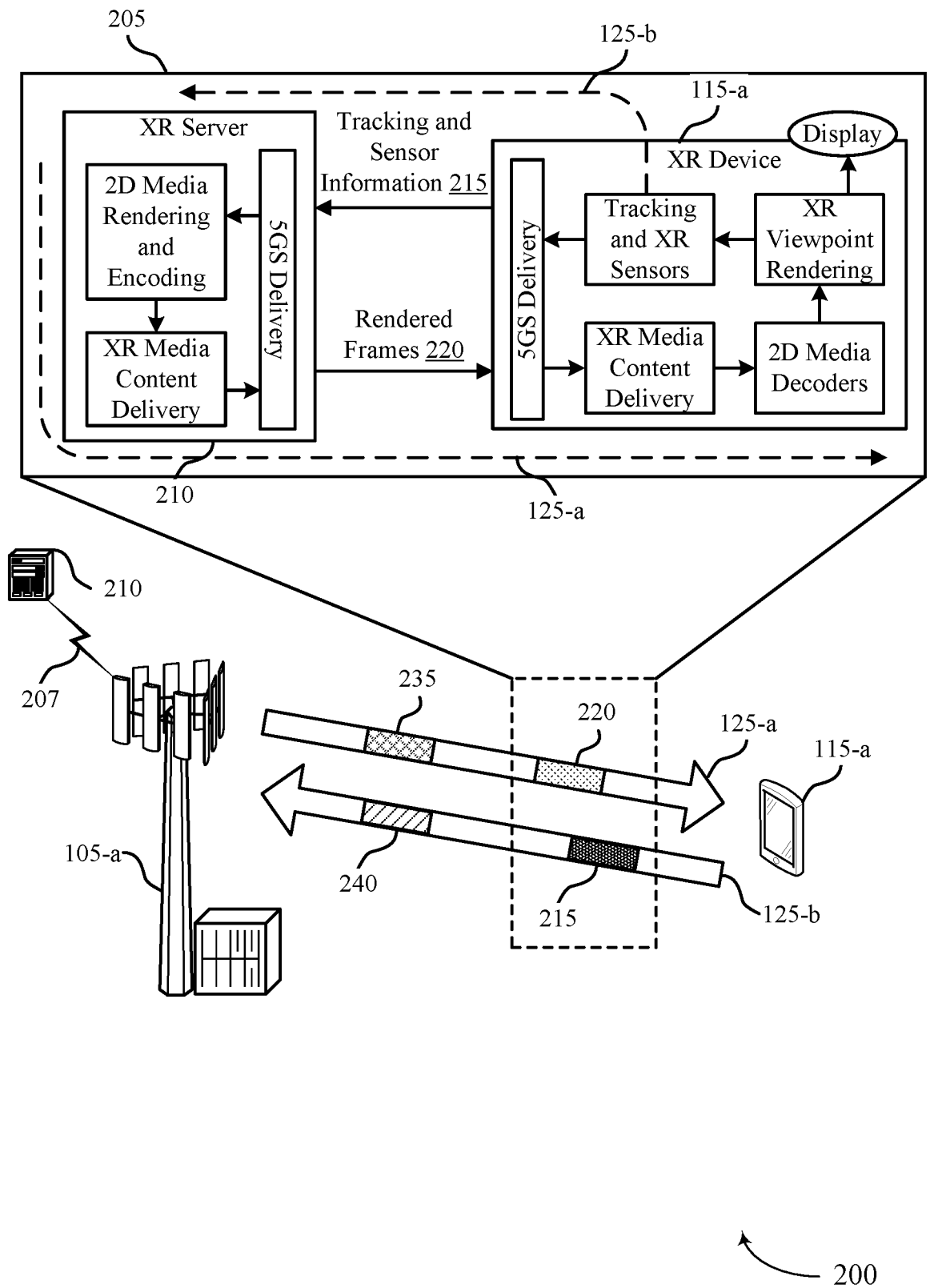
FIG. 2 illustrates an example of a wireless communications system that supports CDRX settings for periodic traffic with jitter in accordance with one or more aspects of the present disclosure.

FIG. 2 illustrates an example of a wireless communications system 200 that supports CDRX settings for periodic traffic with jitter in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. Additionally, the wireless communications system 200 may include an XR server 210, which may include or be an example of a core network 130 or components of a core network 130, as described with reference to FIG. 1. The UE 115-a or the network entity 105-a may communicate with the XR server 210 directly or indirectly.

In the example of FIG. 2, the UE 115-a may include or be an example of an XR device, and may communicate with an XR server 210 via the network entity 105-a in a SplitXR configuration 205. The SplitXR configuration 205 may be implemented to reduce computational and processing costs for the UE 115-a. In the SplitXR configuration 205, the XR server 210 may perform XR-related multimedia computations alongside the UE 115-a, reducing the computational load of the UE 115-a. The UE 115-a and the XR server 210 may exchange XR-related information by way of the network entity 105-a to support XR applications at the UE 115-a.

For example, the network entity 105-a and the XR server 210 may communicate via a communication link 207. Additionally, the network entity 105-a may communicate with the UE 115-a via one or more communication links 125 (e.g., downlink communication links, uplink communications links, or the like). The communication link 125-a may include or be an example of one or more downlink channels, such as physical downlink shared channels (PDSCHs), physical downlink control channels (PDCCHs), or the like. The communication link 125-b may include or be an example of one or more uplink channels, such as physical uplink shared channels (PUSCHs), physical uplink control channels (PUCCHs), or the like.

The wireless communication system 200 may support CDRX operations. For example, the UE 115-a may operate according to a CDRX configuration which enables the UE 115-a to sleep (e.g., when there is no traffic on the communication link 125-a) and wake up during a periodic window to receive traffic via the communication link 125-a. The network entity 105-a may set (e.g., select) CDRX parameters for the CDRX configuration at the UE 115-a, such as a CDRX cycle (e.g., duty cycle), an inactivity timer, an ON-duration timer, or the like, among other examples. For instance, the network entity 105-a may set a periodicity of the CDRX configuration to match a periodicity of traffic between the UE 115-a and the network entity 105-a, such that periodic windows of the CDRX configuration coincide with periodic traffic arrivals at the UE 115-a. The network entity 105-a may indicate the CDRX configuration including the CDRX parameters to the UE 115-a, e.g., via the communication link 125-a.

In some examples of the of the wireless communications system 200, the UE 115-a (e.g., the XR device) may include XR-related components, such as tracking and XR sensors used to collect tracking and sensor information 215 for XR-related multimedia operations. The tracking and sensor information 215 may be data such as user pose and input data. The UE 115-a may transmit or otherwise report the tracking and sensor information 215 to the XR server 210 by way of the network entity 105-a. For example, the UE 115-a may transmit the tracking and sensor information 215 to the network entity 105-a via the communication link 125-a. The tracking and sensor information 215 (e.g., user pose data) may be used by the XR server 210 to create rendered video frames (e.g., the set of rendered frames 220) for the UE 115-a. In some examples, the tracking and sensor information 215 may be updated and reported over time, e.g., according to a current user position. For example, the UE 115-*a* may transmit the tracking and sensor information 215 at a periodicity equal to a video frame rate at the UE 115-*a* (e.g., 90 Hz).

The XR server 210 may include components for performing XR applications related to rendering and encoding XR multimedia content. For example, the XR server 210 may generate 2D media content for the UE 115-*a* based on receiving the tracking and sensor information 215. The XR server 210 may render and encode the 2D media content. The XR server 210 may deliver the XR media content to the UE 115-*a* via a communication link (e.g., an LTE or 5G communication link), such as the communication link 125-*a*. For example, the XR server 210 may generate a set of rendered frames 220, which may include or be an example of a set of 2D video frames. The set of rendered frames 220 may be encoded at the XR server 210 and transmitted to the UE 115-*a*. In some examples, the set of rendered frames 220 may be based on the tracking and sensor information 215 (e.g., user pose and input data) transmitted from the UE 115-*a* (e.g., the XR device). For instance, the XR server 210 may utilize the tracking and sensor information 215 to determine media content to be displayed at the UE 115-*a* and may render (e.g., as part of a rendering application) the media content including the set of rendered frames 220.

The UE 115-*a* may receive and process the set of rendered frames 220. For example, the UE 115-*a* may include one or more components for receiving, decoding, and rendering XR media content (e.g., 2D media, such as the set of rendered frames 220). The UE 115-*a* may decode the set of rendered frames 220 and may, in some examples, perform additional rendering (e.g., XR viewpoint rendering) to deliver 2D media to a display of the UE 115-*a*. In some examples, the rate at which the XR server 210 transmits, and the UE 115-*a* receives, the set of rendered frames 220 may correspond to the video frame rate (e.g., 90 Hz) at the UE 115-*a* (e.g., the XR device), e.g., to enable the UE 115-*a* to display media without interruption.

The SplitXR configuration 205 may be associated with latency, for example, associated with the communication links 125, or due to XR applications performed at the UE 115-*a* or the XR server 210. In some examples, XR latency may be defined by an overall Motion to Server Render to Device Display (Photon) (M2R2P) time. The M2R2P may be defined as a summation of a total 5G-Round-Trip-Time (5G-RTT), a total UE 115-*a* (e.g., XR device) processing time, and a total XR server 210 processing time. The 5G-RTT may correspond to a total time duration for the tracking and sensor information 215 to be transmitted via the communication link 125-*b* and the set of rendered frames 220 to be transmitted via the communication link 125-*a*, and may thus include any latency associated with uplink and downlink transmissions in the wireless communications system 200. User experience at the UE 115-*a* may be improved by reducing the M2R2P, which may, in turn, reduce overall latency in the wireless communications system 200. However, the XR server 210, the UE 115-*a*, and the network entity 105-*a* may generate jitter, e.g., due to render times, encoding times, RTP times, or the like, among other examples. In some cases, techniques to reduce the M2R2P may also introduce jitter.

Jitter may introduce uncertainty in traffic arrival times, which may degrade performance at the UE 115-*a*. For example, jitter may cause misalignment between traffic arriving at the UE 115-*a* and periodic windows of the CDRX configuration of the UE 115-*a*, such that the UE 115-*a* fails to receive some or all of an XR traffic burst. Techniques described herein support communicating based on timing that accounts for jitter in the wireless communications system 200. For example, the UE 115-*a* may operate according to a CDRX configuration including a CDRX offset value that is based on estimated traffic arrival times, which may reduce latency and power consumption at the UE 115-*a*.

For example, the network entity 105-*a* may determine a traffic arrival offset value by estimating traffic arrival times of one or more traffic bursts (e.g., at the UE 115-*a*) and based on one or more jitter parameters. The one or more traffic bursts may include the set of rendered frames 220. The network entity 105-*a* may calculate or otherwise determine or select a CDRX offset value based on the traffic arrival offset value. For example, the network entity 105-*a* may set the CDRX offset value to be equal to the traffic offset value. The CDRX offset value may indicate a starting position (e.g., a starting subframe or slot) of a periodic window (e.g., an active time) of the CDRX configuration. The CDRX offset may enable the UE 115-*a* to wake up into an on state at the correct time (e.g., at the starting position) to receive traffic data from the network entity 105-*a*.

Figure 3:
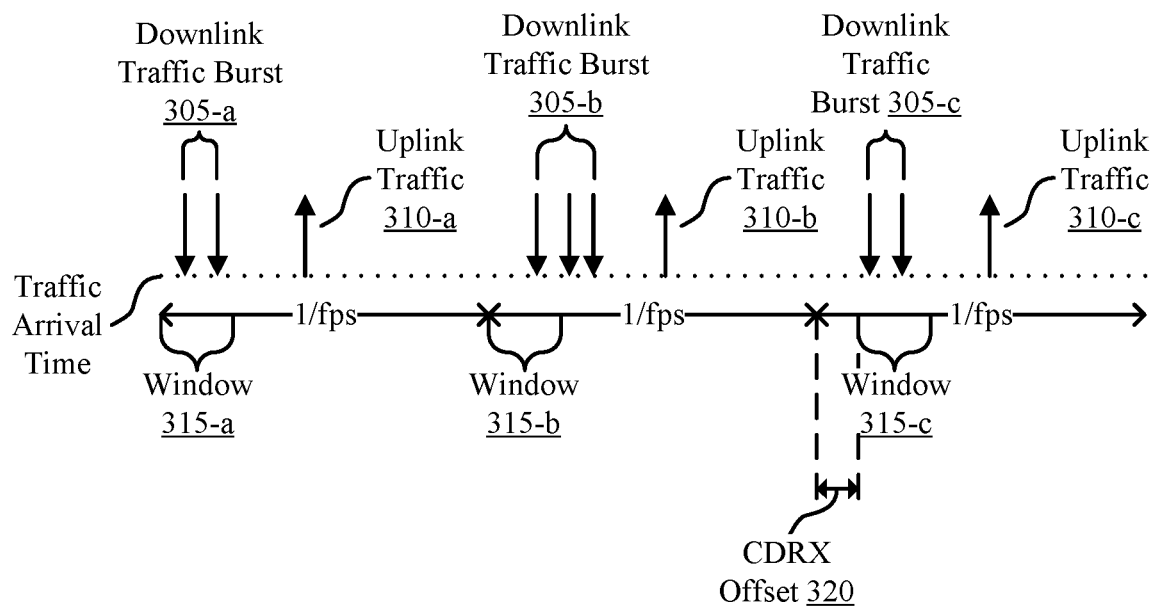
FIG. 3 illustrates an example of a signaling diagram that supports CDRX settings for periodic traffic with jitter in accordance with one or more aspects of the present disclosure.

As described further with reference to FIG. 3, the network entity 105-*a* may select the CDRX offset value and may indicate the CDRX offset value to the UE 115-*a*. For example, the network entity 105-*a* may transmit, to the UE 115-*a* via the communication link 125-*a*, a CDRX configuration message 235 indicating a CDRX configuration for the UE 115-*a*. The CDRX configuration message 235 may include an indication of the CDRX offset value selected by the network entity 105-*a* and, in some cases, one or more other CDRX parameters for the CDRX configuration. The UE 115-*a* may operate in a CDRX mode according to the CDRX offset value.

Additionally, or alternatively, the network entity 105-*a* may dynamically update the CDRX offset value. Here, the network entity 105-*a* may estimate traffic arrival times of a set of traffic bursts (e.g., including the set of rendered frames 220), and may recalculate the CDRX offset value by estimating arrival times of different sets of traffic bursts over time. For example, the network entity 105-*a* may calculate a first CDRX offset value using a first set of traffic bursts arriving at the UE 115-*a*, and may indicate the first CDRX offset value to the UE 115-*a* (e.g., via the CDRX configuration message 235). The network entity 105-*a* may update the CDRX offset value by calculating a second CDRX offset value based on a second set of traffic bursts arriving at the UE 115-*a*, and indicating the second CDRX offset value to the UE 115-*a*.

In some cases, the UE 115-*a* may calculate or otherwise determine or select the CDRX offset value. The UE 115-*a* may estimate traffic arrival times of one or more traffic bursts (e.g., at the XR server 210) and may determine one or more jitter parameters. The UE 115-*a* may select the CDRX offset value based on a traffic arrival offset value associated with the estimated traffic arrival times and the one or more jitter parameters. Here, the CDRX offset value determined by the UE 115-*a* may be a CDRX offset value that is preferred by the UE 115-*a*, e.g., that the UE 115-*a* prefers the network entity 105-*a* to use in the CDRX configuration. The UE 115-*a* may indicate (e.g., request) the CDRX offset value to the network entity 105-*a* via a CDRX configuration request message 240. The network entity 105-*a* may select a CDRX offset value for the UE 115-*a* to use based on receiving the CDRX configuration request message 240.

FIG. 3 illustrates an example of a signaling diagram 300 that supports CDRX settings for periodic traffic with jitter in accordance with one or more aspects of the present disclosure. The signaling diagram 300 may implement aspects of wireless communication systems 100 and 200 or may be implemented by aspects of the wireless communication systems 100 and 200. For example, the signaling diagram 300 may be implemented by one or more wireless devices, such as a network entity 105, a UE 115, or an XR server 210, which may be examples of corresponding devices as described with reference to FIGS. 1 and 2.

The signaling diagram 300 may be an example of a flow of traffic arrival in time. For example, the signaling diagram 300 may include a downlink traffic burst 305 (e.g., a downlink traffic burst 305-a, 305-b, or 305-c) that includes one or more packets received at a device (e.g., a UE, an XR device, or the like) at a corresponding traffic arrival time. Additionally, the signaling diagram 300 may include uplink traffic 310 transmitted by the device, for example, to a network entity, an XR server, or the like.

For example, as described with reference to FIG. 2, the signaling diagram 300 may illustrate XR traffic received at and transmitted by a UE, which may include or be an example of an XR device. The UE may transmit uplink traffic 310 to a network entity or XR server. The uplink traffic 310 may include tracking and sensor information, such as pose input, controller data, or other types of XR-related multimedia information or data. In some cases, the uplink traffic may be one or more uplink traffic 310 signals (e.g., uplink traffic 310-a, 310-b, and 310-c) transmitted by the UE at different times. Additionally, an uplink traffic 310 may occur before or after a downlink traffic burst 305. The UE may receive the downlink traffic bursts 305 from the network entity or the XR server. In some cases, a downlink traffic burst 305 may include a set of rendered frames. In some examples, the downlink traffic bursts 305 may be transmitted (e.g., by the network entity, by the XR server) according to a traffic periodicity. The traffic periodicity may correspond to a fps (e.g., a render fps) associated with XR data at the UE. For instance, the periodicity may be equal to 1/fps such that one downlink traffic burst 305 is transmitted per period.

The UE may operate in a CDRX mode according to a CDRX configuration. For example, the network entity may transmit a message indicating a set of CDRX parameters of a CDRX configuration for the CDRX mode. The CDRX configuration may include one or more windows 315, and the set of CDRX parameters may include a CDRX duty cycle periodicity associated with the one or more windows 315. Each window 315 may correspond to or be an example of a time duration in which the UE operates in an on-state and may communicate with a network entity or XR server. For example, during a window 315, the UE may wake up and monitor for transmissions (e.g., downlink traffic burst(s) 305) from the network entity or XR server. Outside of a window 315, the UE may operate in a sleep state and may refrain from monitoring for transmissions. The windows 315 (e.g., window 315-a, window 315-b, window 315-c) may be configured according to a periodicity, such that the UE regularly wakes up to monitor for transmissions during each window 315. For example, the windows 315 may be configured with a periodicity equal to the traffic periodicity of the downlink traffic bursts 305.

As illustrated, the downlink traffic burst 305 arrival times at the UE may be quasi-periodic. For example, the downlink traffic bursts 305 may be configured to arrive at the UE according to a traffic arrival pattern having a periodicity (e.g., a traffic periodicity) of 1/fps, but may be impacted by jitter. Jitter may be caused by factors such as render time, encoder time, RTP packetization time, or a combination thereof, and may introduce randomness into the time at which a downlink traffic burst 305 arrives at the UE. As such, the downlink traffic burst 305 arrival times may be irregular and may not exactly match the traffic arrival pattern, e.g., may not arrive exactly according to the traffic periodicity.

For example, the UE may be configured with a CDRX configuration such that the windows 315 occur at a periodicity corresponding to the traffic periodicity of the downlink traffic bursts 305, which may enable the UE to wake up to receive each downlink traffic burst 305. However, jitter may result in misalignment between the traffic periodicity and the periodicity of the windows 315. For example, the downlink traffic burst 305-b may not fully arrive within the window 315-b. Because the UE may enter the sleep mode (e.g., and refrain from monitoring from transmissions) at the end of the window 315-b, the UE may fail to receive the portion of the downlink traffic burst 305-b that arrives after the end of the window 315-b. As such, the UE may not receive the entire downlink traffic burst 305-b, which may cause the total M2R2P time and latency associated with the downlink traffic bursts 305 to increase.

Accordingly, the UE may be configured with a CDRX offset value for a CDRX offset 320. For example, the network entity may select the CDRX offset value for the CDRX offset 320 and may indicate the CDRX offset value to the UE, e.g., as part of the set of CDRX parameters. As illustrated, the CDRX offset 320 may adjust a window 315 (e.g., the window 315-c) to enable the UE to receive the entirety of the downlink traffic burst 305-c. For example, the CDRX offset 320 may indicate a start time for the window 315-c that is based on an estimated arrival time of the downlink traffic burst 305-c. The CDRX offset value may correspond to a quantity of slots, subframes, or other units in the time domain, such that the CDRX offset value indicates the CDRX offset 320. In some cases, the CDRX offset may be based on the actual arrival time of the downlink traffic burst 305-a, the downlink traffic burst 305-b, or a combination thereof. Additionally, the CDRX offset 320 may be based on one or more jitter parameters. The one or more jitter parameters may represent an adjustment to a traffic arrival time that is caused by jitter.

The impact of jitter on traffic arrival times may be represented by a random factor r(n). That is, jitter may cause an arrival time of a given downlink traffic burst 305 to deviate from an expected arrival time (e.g., based on a perfectly periodic traffic arrival pattern), where the deviation from the expected arrival time may be represented by r(n). The random factor r(n) may be modeled as a truncated Gaussian distribution in the range $[r_{min}, r_{max}]$, where r is in ms. In some examples the range may be defined as $[r_{min}, r_{max}]\cong[-5$ ms, 5 ms], where the distribution may have a standard deviation of 2 ms. The distribution of r(n) may represent a spread in traffic arrival times due to varying factors (e.g., render time, encoding time, or RTP packetization time). In some cases, the distribution of r (n) may be expected to be immune to the value of the fps.

To select the CDRX offset value, the network entity may determine the traffic periodicity associated with at least one downlink traffic burst 305. The traffic periodicity may be based on a timing parameter. In some examples, the timing parameter may include the rendering fps. For example, if the rendering fps is known, the traffic periodicity p. may be defined as $$p = \frac{1}{fps}.$$

Alternatively, if the network entity is unaware of the rendering fps, the network entity may estimate the traffic periodicity based on an average downlink traffic arrival time for two or more downlink traffic bursts 305.

The downlink traffic arrival time for a downlink traffic burst 305 may be represented by Equation 1 below. For an nth downlink traffic burst 305 including one or more packets, the downlink traffic arrival time $t5_{DL_A}$ (n) may be determined based on the traffic periodicity, the random factor (e.g., jitter), and an initial time $t5_0$.

$$t5_{DL_A}(n) = t5_0 + \frac{n-1}{FPS} + r(n) \quad (1)$$

When the network entity does not know the rendering fps, the traffic periodicity may be calculated using the downlink traffic arrival times for two or more downlink traffic bursts 305, as shown in Equation 2 below.

$$p = \text{mean}(\{t5_{DL_A}(n+1) - t5_{DL_A}(n)\}) \quad (2)$$

For example, the network entity may calculate the traffic periodicity for the signaling diagram 300 using a traffic arrival time of the downlink traffic burst 305-a (e.g., $t5_{DL_A}$ (n)) and the downlink traffic burst 305-b (e.g., $t5_{DL_A}$(n+1)). The traffic periodicity may be equal to an average traffic arrival time of the downlink traffic burst 305-a and the downlink traffic burst 305-b. In some examples, the network entity may set the CDRX duty cycle periodicity for the windows 315 to be equal to the traffic periodicity calculated by Equation 2.

Based on the traffic periodicity, the network entity may determine (e.g., calculate) an estimated arrival time $r_{est}(n)$ associated with a downlink traffic burst 305 (e.g., one or more packets of the downlink traffic burst 305). For example, for an nth downlink traffic burst 305, the estimated arrival time may be equal to a difference between an actual arrival time of the downlink traffic burst 305 and an expected arrival time. The expected arrival time may correspond to an arrival time of the downlink traffic burst 305 without jitter, e.g., if the downlink traffic burst 305 arrived exactly according to the traffic periodicity. The estimated arrival time may be represented by Equation 3 below.

$$r_{est}(n) = t5_{DL_A}(n) - (t5_{DL_A}(1) + (n-1)*p) \quad (3)$$

In some examples, the network entity may calculate an estimated arrival time for multiple downlink traffic bursts 305. For example, the network entity may calculate $r_{est}$ (n) for each of the downlink traffic bursts 305-a, 305-b, and 305-c. Additionally, or alternatively, the network entity may calculate $r_{est}(n)$ for a set of n downlink traffic bursts 305. In either case, the network entity may determine one or more jitter parameters based on the values of $r_{est}(n)$ for the downlink traffic bursts 305. For example, a first jitter parameter may correspond to a minimum phase of the estimated arrival time(s). Here, the network entity may determine, for one or more values of n, a minimum value of $r_{est}(n)$ corresponding to a minimum phase. The minimum phase may indicate an earliest arrival time for a downlink traffic burst 305.

For example, the network entity may calculate Equation 3 for the downlink traffic burst 305-a to determine $r_{est}(1)$. The network entity may calculate Equation 3 for the downlink traffic burst 305-b to determine $r_{est}(2)$. The minimum value of $r_{est}(1)$ and $r_{est}(2)$ may correspond to the minimum phase. Based on the minimum phase, the network entity may estimate (e.g., predict) an earliest arrival time (e.g., an earliest possible arrival time) for the downlink traffic burst 305-c.

A second jitter parameter may correspond to a percentage value of the estimated arrival time(s) associated with one or more downlink traffic bursts 305. For example, an x percentile value of $r_{est}(n)$ may represent a traffic arrival time corresponding to x percent of traffic (e.g., x percent of the traffic arrives at the traffic arrival time).

In some cases, the second jitter parameter may be understood as a percentage value of jitter (e.g., of a jitter value). Here, the second jitter parameter may be equal to a percentage value of a difference between a nominal arrival time of a downlink traffic burst 305 (e.g., an arrival time as predicted by a periodic pattern with calculated periodicity p and without jitter) and the estimated arrival time of the downlink traffic burst 305.

The network entity may determine (e.g., calculate) a traffic arrival offset value based on the traffic periodicity, the estimated arrival time(s) of the one or more downlink traffic bursts 305, and at least one jitter parameter. For example, for a downlink traffic burst 305, the at least one jitter parameter may be the minimum phase, such that the network entity may estimate the traffic arrival offset based on an earliest arrival time and an actual arrival time of the downlink traffic burst 305. The traffic arrival offset may be represented by Equation 4 shown below, where $t5_{DL_A}(1)$ is the first arrival time for a traffic burst and the $\text{Min}_{phase}$ is equal to $\min(r_{est}$ (n)). In some examples, the first arrival time for a traffic burst may correspond to a nominal arrival time of the traffic burst.

$$\text{traffic arrival offset} = t5_{DL_A}(1)\text{Min}_{phase} \quad (4)$$

The network entity may select the CDRX offset value based on the traffic arrival offset value. When the traffic arrival offset value is given by Equation 4 (e.g., when the jitter parameter corresponds to a minimum phase), the CDRX offset value may enable the UE to receive the earliest arriving downlink traffic bursts 305. That is, a CDRX offset value based on min ($r_{est}$ (n)) may enable the UE to receive downlink traffic bursts 305 that would otherwise arrive before a window 315. For example, the CDRX offset value may indicate a starting location of a window 315 that occurs before arrival of a downlink traffic burst 305.

Alternatively, the network entity may calculate (e.g., determine or estimate) a traffic arrival offset value based on the earliest arrival time (e.g., min ($r_{est}(n)$)) and the percentage value DPx, as shown in Equation 5 below. For example, the traffic arrival offset value may correspond to a summation of a nominal arrival time of a downlink traffic burst 305, a minimum phase of the downlink traffic burst 305, and a percentage value of jitter.

$$\text{traffic arrival offset} = t5DL_A(1) + \text{Min}_{phase} + DPx \quad (5)$$

In Equation 5, DPx represents the x percentile of ($r_{est}$ (n)), e.g., a percentage of traffic arriving at a given arrival time. The network entity may select the CDRX offset value based on Equation 5 to enable the UE to receive approximately x percent of traffic. For example, if x=50, the CDRX offset value may enable the UE to receive approximately 50% of traffic. Put another way, the CDRX offset value may adjust the starting location of a window 315 such that the windows 315 are positioned to receive 50% of the downlink traffic bursts 305. In some cases, the network entity may select the value of x based on a trade-off between latency and power. For example, relatively low values of x may be associated with relatively low latency but higher power consumption, while relatively high values of x may correspond to relatively high latency and reduced power consumption. In some examples, the network entity may select the value of x based on a quality of service for a communication link between the network entity 105 and the UE 115, a packed delay budget, or a combination thereof.

In some cases, the network entity may statically determine the CDRX offset value. Here, the network entity may determine the CDRX offset value based on the traffic arrival offset value calculated for, e.g., a single downlink traffic burst 305. For example, during set-up of the CDRX configuration for the UE, the network entity may determine the CDRX offset value based on the downlink traffic burst 305-a. The network entity may configure the UE with the CDRX offset value, and the UE may operate in the CDRX mode according to the CDRX offset value until otherwise indicated (e.g., until instructed otherwise, or until the UE is reconfigured with a new CDRX offset value or CDRX configuration).

Alternatively, the network entity may dynamically estimate the traffic arrival offset over time, and may update the CDRX offset value based on the dynamic estimation of the traffic arrival offset(s). For example, the network entity may determine the CDRX offset value based on a traffic arrival offset value corresponding to a set of downlink traffic bursts 305. The set of downlink traffic bursts 305 may correspond to the m most recently received downlink traffic bursts 305, such that the network entity continuously recalculates and updates the CDRX offset value as new downlink traffic bursts 305 are received. The network entity may indicate the updated CDRX offset value to the UE. Updating the CDRX offset value in this manner may enable the UE to dynamically adjust the CDRX offset 320 to ensure reception of the downlink traffic bursts 305.

For example, the network entity may estimate the traffic arrival offset value based on the at least one jitter parameter and a set of estimated arrival times for a set of downlink traffic bursts 305, as shown in Equation 6 below. The traffic arrival offset value may be a function of the set of estimated arrival times, where the set of downlink traffic bursts 305 includes a set of m most recently received downlink traffic bursts 305. The network entity may select the CDRX offset value based on Equation 6. For example, the network entity may select the CDRX offset value to be equal to the traffic arrival offset value given by Equation 6.

$$\text{traffic arrival offset} = t5_{DL_A}(1) + f(r_{est}(n), r_{est}(n-1), \ldots, r_{est}(n-m)) \quad (6)$$

In some cases, the traffic arrival offset value may be a function of the at least one jitter parameter. For example, the function $f$ may correspond to the Mill phase as represented in Equation 7 below.

$$\text{Min}_{phase} = \min(r_{est}(n), r_{est}(n-1), \ldots, r_{est}(n-m)) \quad (7)$$

In this example, for an nth downlink traffic burst 305, the network entity may calculate Equation 7 to determine the minimum phase corresponding to the last (e.g., most recent) m estimated arrival times (e.g., of the last m downlink traffic bursts 305). As in Equation 4, the network entity may calculate the traffic arrival offset value (and the CDRX offset value) based on the minimum phase to set the CDRX offset 320 such that the UE may receive the earliest arriving downlink traffic bursts 305.

As another example, the traffic arrival offset value may be a function of the minimum phase and a percentage value of jitter associated with the set of estimated arrival times for the set of downlink traffic bursts 305, where the percentage value is represented by DPx. For example, the function $f$ may be represented by Equation 8 as shown below.

$$DPx = x\% * r_{est}(r_{est}(n), r_{est}(n-1), \ldots, r_{est}(n-m)) \quad (8)$$

Here, the percentage value may be equal to a difference between each estimated arrival time associated with a respective downlink traffic burst 305 of the set of downlink traffic bursts 305 and each nominal arrival time associated with a respective downlink traffic burst 305 of the set of downlink traffic bursts 305. In some examples, the network entity may select the value of x or the function $f$ based on a tradeoff between latency and power consumption. In such examples, adjusting the CDRX offset dynamically may be suitable for cases where the jitter (e.g., r (n)) has time correlation. For example, render time, encoder time, and RTP packetization time may correspond to time-based jitter due to time-correlated content being rendered and encoded.

In some cases, the network entity may dynamically update the CDRX offset value when changes in the arrival times (e.g., the estimated arrival times) result in relatively large changes in the CDRX offset values. For instance, the network entity may calculate a first CDRX offset value based on a first set of downlink traffic bursts 305. The network entity may set the CDRX offset value for the UE to be equal to the first CDRX offset value. Over time, the UE may receive a second set of downlink traffic bursts 305. The network entity may calculate a second CDRX offset value based on the second set of downlink traffic bursts 305. However, if the second CDRX offset value does not change with respect to the first CDRX offset value, the network entity may refrain from updating the CDRX offset value for the UE, e.g., to avoid increased signaling overhead. Alternatively, if the second CDRX offset value is significantly different than the first CDRX offset value, the network entity may update the CDRX offset value for the UE by indicating the second CDRX offset value to the UE.

For example, the network entity may semi-statically update the CDRX offset value if a difference (e.g., an absolute value of a difference) between the first CDRX offset value and the second CDRX offset value satisfies (e.g., is greater than) a first threshold, as shown in Equation 9.

$$|CDRX\_offset_1 - CDRX\_offset_2| > \text{Threshold 1} \quad (9)$$

If the Equation 9 satisfies the first threshold, the network entity may select the second CDRX offset value for the CDRX offset 320. In this example, the network entity may transmit an RRC message to the UE including an indication of the second CDRX offset value. The UE may operate in the CDRX mode according to the second CDRX offset value based on receiving the RRC message.

In another example, the network entity may update the CDRX offset value more dynamically (e.g., with increased frequency as compared to an RRC message) using a MAC-CE and second threshold, where the second threshold may be less than the first threshold. If Equation 9 satisfies the second threshold, the network entity may select the second CDRX offset value and may indicate the second CDRX offset value to the UE in a MAC-CE. Additionally, or alternatively, the network entity may update the CDRX offset value based on a third threshold, where the third threshold may be less than the second threshold. Here, if Equation 9 satisfies the third threshold, the network entity may indicate the second CDRX offset value to the UE as part of a wake-up signal. In some examples, the network entity may update the CDRX offset value based on a combination of the first threshold, the second threshold, and the third threshold. For example, the network entity may dynamically select and update the CDRX offset value using corresponding signaling (e.g., RRC signaling, MAC-CE, a wake-up signal) at a frequency determined by the first, second, and third thresholds.

In some examples, the UE may calculate and select the CDRX offset value for the CDRX offset 320 as described herein. For example, the UE may determine the CDRX offset value based on Equations 1 through 8. The UE may indicate the CDRX offset value to the network entity, for example, as part of a CDRX configuration request message (e.g., an uplink traffic 310). The UE may transmit the CDRX configuration request message to indicate a request for the network entity to use the indicated CDRX offset value. For example, the network entity may set the CDRX offset value for the CDRX offset 320 to be equal to the CDRX offset value indicated by the UE.

Figure 4:
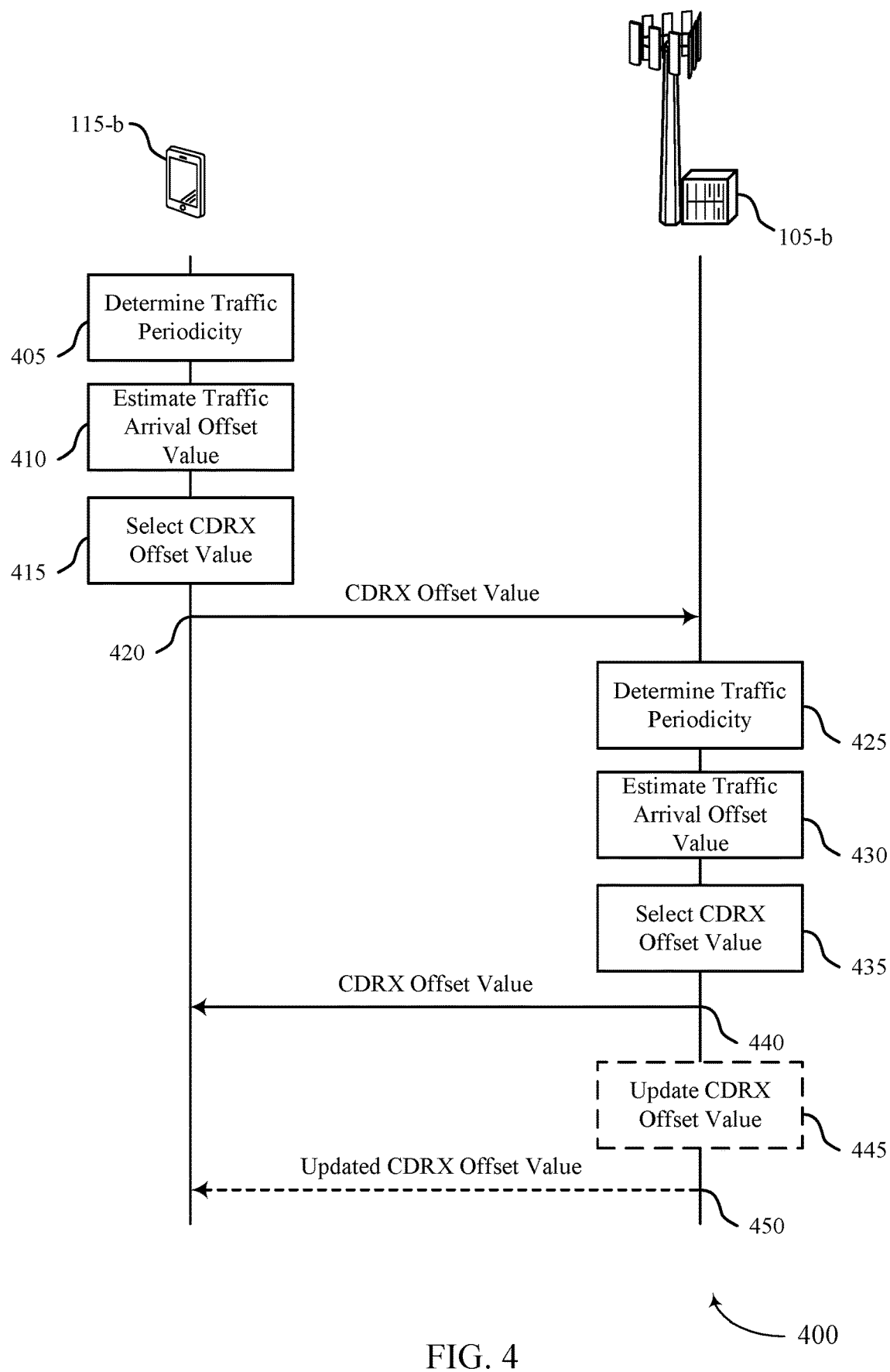
FIG. 4 illustrates an example of a process flow that supports CDRX settings for periodic traffic with jitter in accordance with one or more aspects of the present disclosure.

FIG. 4 illustrates an example of a process flow 400 that supports CDRX settings for periodic traffic with jitter in accordance with one or more aspects of the present disclosure. The process flow 400 may implement aspects of wireless communications systems 100 and 200 or may be implemented by aspects of the wireless communications systems 100 and 200. For example, the process flow 400 may illustrate operations between a UE 115-*b* and a network entity 105-*b*, which may be examples of corresponding devices described herein. In the following description of the process flow 400, the operations between the UE 115-*b* and the network entity 105 *b* may be transmitted in a different order than the example order shown, or the operations performed by the UE 115-*b* and the network entity 105-*b* may be performed in different orders or at different times. Some operations may also be omitted from the process flow 400, and other operations may be added to the process flow 400.

At 405, the UE 115-*b* may determine a traffic periodicity associated with one or more packets of a traffic burst based on a timing parameter associated with the one or more packets of the traffic burst. For example, the timing parameter may include a rendering fps value or an average downlink traffic arrival time for two or more traffic bursts. For example, the UE 115-*b* may determine the traffic periodicity according to Equation 2.

At 410, the UE 115-*b* may estimate a traffic arrival offset value based on the traffic periodicity determined at 405, an estimated arrival time associated with the one or more packets of the traffic burst, and at least one jitter parameter. For example, the UE 115-*b* may determine the estimated arrival time associated with the one or more packets of the traffic burst using Equation 3 based on a set of traffic bursts, a quantity of traffic bursts of the set of traffic bursts, a first arrival time for a first traffic burst of the set of traffic bursts, the traffic periodicity, or a combination thereof. The at least one jitter parameter may include a minimum phase corresponding to an earliest arrival time associated with the one or more packets of the traffic burst, a percentage value of a difference between the estimated arrival time associated with the one or more packets of the traffic burst and a nominal arrival time associated with the one or more packets of the traffic burst (e.g. a percentage value of jitter), or a combination thereof. For example, the at least one jitter parameter may correspond to a minimum phase and the UE 115-*b* may calculate the traffic arrival offset value according to Equation 4. In another example, the at least one jitter parameter may correspond to the minimum phase and the percentage value, and the UE 115-*b* may calculate the traffic arrival offset value according to Equation 5.

In some examples, the estimated traffic arrival offset value and the traffic periodicity may be associated with an arrival of the one or more packets of the traffic burst at a server.

In some examples, the UE 115-*b* may determine the estimated traffic arrival offset value based on the at least one jitter parameter and a set of estimated arrival times for a set of traffic bursts including the traffic burst. In such examples, the at least one jitter parameter may include a set of earliest arrival times associated with the set of traffic bursts and may correspond to Equation 7. Alternatively, the at least one jitter parameter may include the set of earliest arrival times associated with the set of traffic bursts and a percentage value of a difference between respective estimated arrival times associated with each traffic burst and respective nominal arrival times associated with each traffic burst for the set of traffic bursts and may correspond to Equation 8.

In some cases, the percentage value may be based on a quality of service for a communication link between the UE 115-*b* and the network entity 105-*b*, a packet delay budget associated with the UE 115-*b*, or a combination thereof.

At 415, the UE 115-*b* may select a CDRX offset value based on the estimated traffic arrival offset value estimated at 410. In some implementations, the UE 115-*b* may select the CDRX offset value to be equal to the estimated traffic arrival offset.

At 420, the UE 115-*b* may transmit, and the network entity 105-*b* may receive, a message indicating the CDRX offset value (e.g., selected at 415) for the UE 115-*b* to operate in a CDRX mode according to the CDRX offset value (e.g., selected at 415). For example, the UE 115-*b* may transmit the message to request that the network entity 105-*b* use the indicated CDRX offset value for a CDRX configuration for the UE 115-*b*. The CDRX offset value indicated in the message at 420 may be an example of a preferred CDRX offset value, e.g., preferred by the UE 115-*b* for operating in the CDRX mode.

At 425, the network entity 105-*b* may determine a traffic periodicity associated with one or more packets of a traffic burst based on a timing parameter associated with the one or more packets of the traffic burst. For example, the timing parameter may include a rendering fps value (e.g., associated with the UE 115-*b*) or an average downlink traffic arrival time for two or more traffic bursts arriving at the UE 115-*b*. For example, the network entity 105-*b* may determine the traffic periodicity according to Equation 2.

In some examples, the network entity 105-*b* may select a CDRX duty cycle periodicity for the UE 115-*b* to be equal to the traffic periodicity.

At 430, the network entity 105-*b* may estimate a traffic arrival offset value based on the traffic periodicity determined at 425, an estimated arrival time associated with the one or more packets of the traffic burst, and at least one jitter parameter. For example, the network entity 105-*b* may determine the estimated arrival time associated with the one or more packets of the traffic burst using Equation 3 based on a set of traffic bursts, a quantity of traffic bursts of the set of traffic bursts, a first arrival time for a first traffic burst of the set of traffic bursts, the traffic periodicity, or a combination thereof. The at least one jitter parameter may include a minimum phase corresponding to an earliest arrival time associated with the one or more packets of the traffic burst, a percentage value of a difference between the estimated arrival time associated with the one or more packets of the traffic burst and a nominal arrival time associated with the one or more packets of the traffic burst, or a combination thereof. For example, the at least one jitter parameter may correspond to a minimum phase and the network entity 105-*b* may calculate the traffic arrival offset value according to Equation 4. In another example, the at least one jitter parameter may correspond to the minimum phase and the percentage value, and the network entity 105-*b* may calculate the traffic arrival offset value according to Equation 5.

In some examples, the estimated traffic arrival offset value and the traffic periodicity may be associated with an arrival of the one or more packets of the traffic burst at the UE 115-*b*.

In some examples, the network entity 105-*b* may determine the estimated traffic arrival offset value based on the at least one jitter parameter and a set of estimated arrival times for a set of traffic bursts including the traffic burst. In such examples, the at least one jitter parameter may include a set of earliest arrival times associated with the set of traffic bursts and may correspond to Equation 7. Alternatively, the at least one jitter parameter may include the set of earliest arrival times associated with the set of traffic bursts and a percentage value of a difference between respective estimated arrival times associated with each traffic burst and respective nominal arrival times associated with each traffic burst for the set of traffic bursts and may correspond to Equation 8.

In some cases, the percentage value may be based on a quality of service for a communication link between the UE 115-*b* and the network entity 105-*b*, a packet delay budget associated with the UE 115-*b*, or a combination thereof.

At 435, the network entity 105-*b* may select a CDRX offset value based on the estimated traffic arrival offset determined at 430. In some examples, the network entity 105-*b* may select the CDRX offset value to be equal to the estimated traffic arrival offset value determined at 430 plus a UE 115-*b* specific offset. For example, the network entity 105-*b* may select or otherwise determine a UE 115-*b* specific offset based on scheduling the traffic burst for the UE 115-*b*. The UE 115-*b* specific offset may be based on scheduling delays associated with the UE 115-*b*, the packet delay budget of the UE 115-*b*, the quality of service for the communication link between the UE 115-*b* and the network entity 105-*b*, or a combination thereof.

At 440, the network entity 105-*b* may transmit, and the UE 115-*b* may receive, a message indicating the CDRX offset value for the UE 115-*b* to operate in a CDRX mode according to the CDRX offset value. In some examples, the message indicating the CDRX offset value may include an indication of a set of CDRX parameters of a CDRX configuration for the CDRX mode. For example, the network entity 105-*b* may transmit the message at 440 indicating the set of CDRX parameters including the CDRX offset value, the CDRX duty cycle periodicity, or both. The CDRX configuration may be for the UE 115-*b* to operate in the CDRX mode according to the set of CDRX parameters.

In some examples, the CDRX offset value indicated in the message transmitted by the network entity 105-*b* at 440 may be the same as the preferred CDRX offset value indicated in the message transmitted by the UE 115-*b* at 420. For example, the network entity 105-*b* may select, at 435, the preferred CDRX offset value indicated in the message at 420. At 440, the network entity 105-*b* may transmit the message to the UE 115-*b* indicating the preferred CDRX offset value.

At 445, in some examples, the network entity 105-*b* may update the CDRX offset value. The network entity 105-*b* may, for example, update the estimated traffic arrival offset from 430 based on a second set of estimated arrival times for a second set of traffic bursts. For example, the network entity 105-*b* may calculate a second traffic arrival offset value based on the second set of estimated arrival times and at least one jitter parameter. The network entity 105-*b* may select a second CDRX offset value based on the second traffic arrival offset value. For example, the network entity 105-*b* may select the second CDRX offset value to be equal to the second traffic arrival offset value, or to be equal to the second traffic arrival offset value plus a UE-specific offset (e.g., specific to the UE 115-*b*). The network entity 105-*b* may update the CDRX offset value to be equal to the second CDRX offset value.

In some examples, the network entity 105-*b* may update (or refrain from updating) the CDRX offset value based on one or more thresholds. For example, the network entity 105-*b* may determine an absolute value of a difference between the CDRX offset value and the second CDRX offset value. The network entity 105-*b* may compare the absolute value to at least one of a first threshold, a second threshold, and a third threshold (e.g., according to Equation 9). The first threshold may be larger than the second threshold, and the second threshold may be larger than the third threshold. As an example, the network entity 105-*b* may compare the absolute value to the third threshold. If the absolute value satisfies (e.g., is greater than) the third threshold, the network entity 105-*b* may update the CDRX value to be equal to the second CDRX offset value. However, if the absolute value fails to satisfy the third threshold, the network entity 105-*b* may compare the absolute value to the second threshold. If the absolute value satisfies (e.g., is greater than) the second threshold, the network entity 105-*b* may update the CDRX offset value to be equal to the second CDRX offset value. Alternatively, if the absolute value fails to satisfy the second threshold, the network entity 105-*b* may compare the absolute value to the first threshold. If the absolute value satisfies (e.g., is greater than) the first threshold, the network entity 105-*b* may update the CDRX offset value to be equal to the second CDRX offset value. If the absolute value fails to satisfy the first threshold, the network entity 105-*b* may refrain from updating the CDRX offset value.

At 450, in some examples, the network entity 105-*b* may transmit, to the UE 115-*b*, a second message indicating the updated CDRX offset value. In some examples, the second message may be based on the one or more thresholds. For example, if the absolute value satisfies the third threshold, the network entity 105-*b* may transmit the indication of the updated CDRX offset value as part of a wake-up signal (e.g., the second message may be a wake-up signal). If the absolute value satisfies the second threshold, the network entity 105-*b* may transmit the indication of the updated CDRX offset value as part of a MAC-CE (e.g., the second message may be a MAC-CE). If the absolute value satisfies the third threshold, the network entity 105-*b* may transmit the indication of the updated CDRX offset value as part of an RRC message (e.g., the second message may be an RRC message).

The UE 115-*b* may operate in the CDRX mode according to the CDRX offset value indicated by the network entity 105-*b*. For example, the UE 115-*b* may operate in the CDRX mode according to the CDRX offset value indicated at 440 or the updated CDRX offset value indicated at 450. Additionally, the UE 115-*b* may operate in the CDRX mode according to a set of CDRX parameters indicated by the network entity 105-*b*. For instance, the UE 115-*b* may operate according to the CDRX duty cycle periodicity indicated by the network entity 105-*b*.

Figure 5:
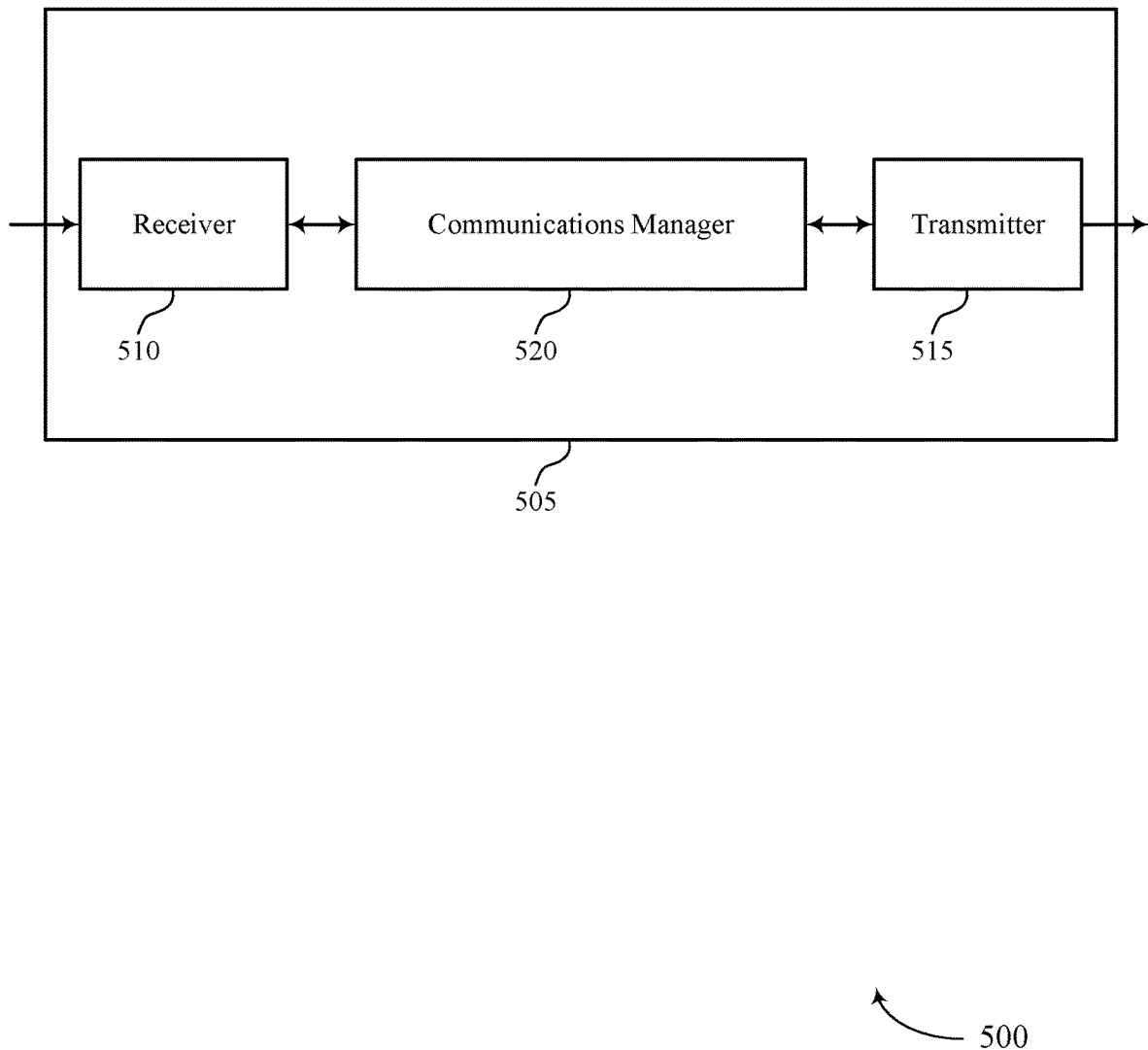
FIGS. 5 and 6 show block diagrams of devices that support CDRX settings for periodic traffic with jitter in accordance with one or more aspects of the present disclosure.

FIG. 5 shows a block diagram 500 of a device 505 that supports CDRX settings for periodic traffic with jitter in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of CDRX settings for periodic traffic with jitter as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a graphics processing unit (GPU), an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a network entity in accordance with examples as disclosed herein. For example, the communications manager 520 may be configured as or otherwise support a means for determining a traffic periodicity associated with one or more packets of a traffic burst based on a timing parameter associated with the one or more packets of the traffic burst. The communications manager 520 may be configured as or otherwise support a means for estimating a traffic arrival offset value based on the traffic periodicity, an estimated arrival time associated with the one or more packets of the traffic burst, and at least one jitter parameter. The communications manager 520 may be configured as or otherwise support a means for selecting a CDRX (CDRX) offset value based on the estimated traffic arrival offset value. The communications manager 520 may be configured as or otherwise support a means for transmitting, to a UE, a message indicating the CDRX offset value for the UE to operate in a CDRX mode according to the CDRX offset value.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for adaptively setting CDRX configuration parameters based on traffic patterns. For example, setting a CDRX offset value based on estimated traffic arrival times may improve efficiency in scheduling and utilization of communication resources, reduce latency, and reduce processing at the device 505.

Figure 6:
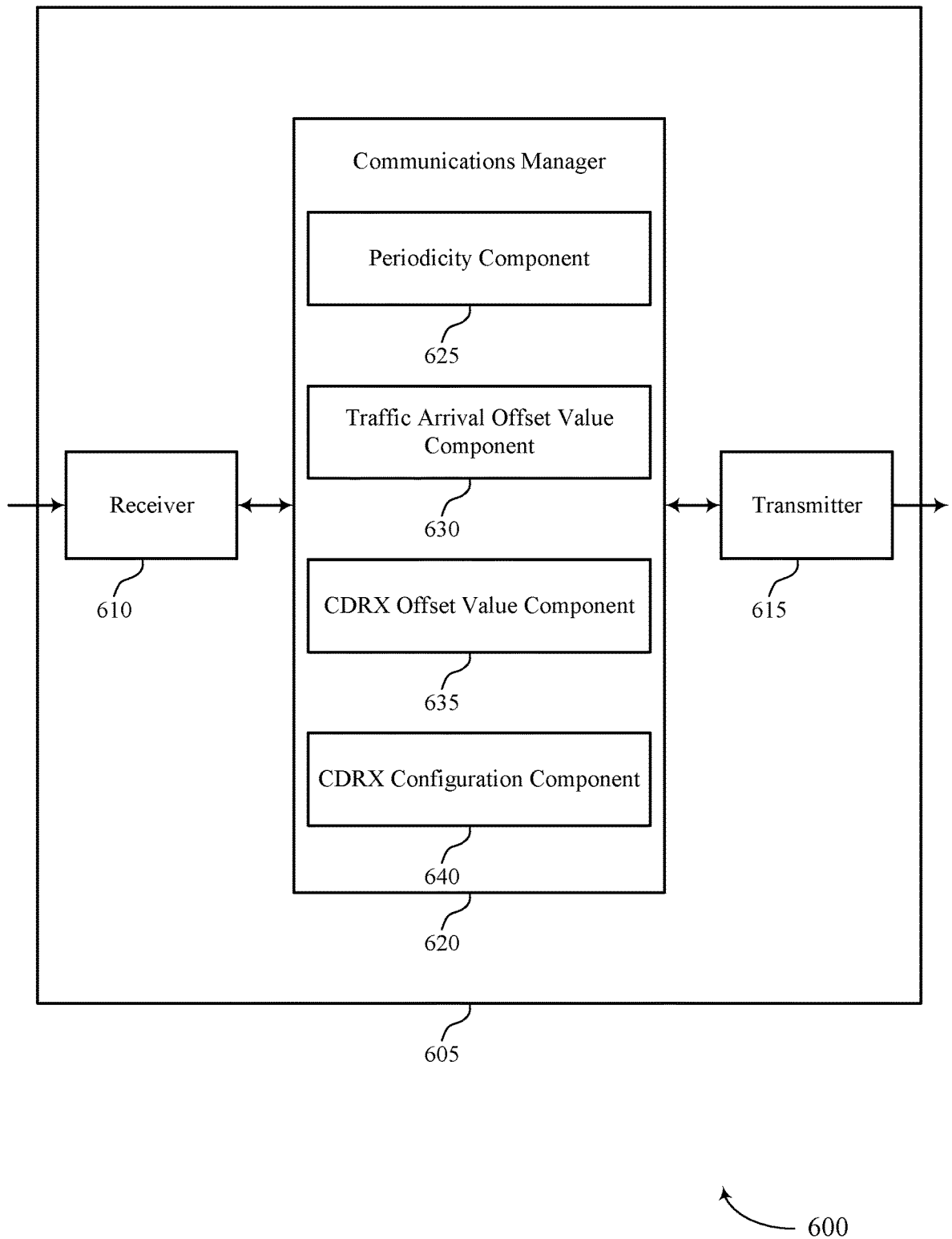

FIG. 6 shows a block diagram 600 of a device 605 that supports CDRX settings for periodic traffic with jitter in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of CDRX settings for periodic traffic with jitter as described herein. For example, the communications manager 620 may include a periodicity component 625, a traffic arrival offset value component 630, a CDRX offset value component 635, a CDRX configuration component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a network entity in accordance with examples as disclosed herein. The periodicity component 625 may be configured as or otherwise support a means for determining a traffic periodicity associated with one or more packets of a traffic burst based on a timing parameter associated with the one or more packets of the traffic burst. The traffic arrival offset value component 630 may be configured as or otherwise support a means for estimating a traffic arrival offset value based on the traffic periodicity, an estimated arrival time associated with the one or more packets of the traffic burst, and at least one jitter parameter. The CDRX offset value component 635 may be configured as or otherwise support a means for selecting a CDRX offset value based on the estimated traffic arrival offset value. The CDRX configuration component 640 may be configured as or otherwise support a means for transmitting, to a UE, a message indicating the CDRX offset value for the UE to operate in a CDRX mode according to the CDRX offset value.

Figure 7:
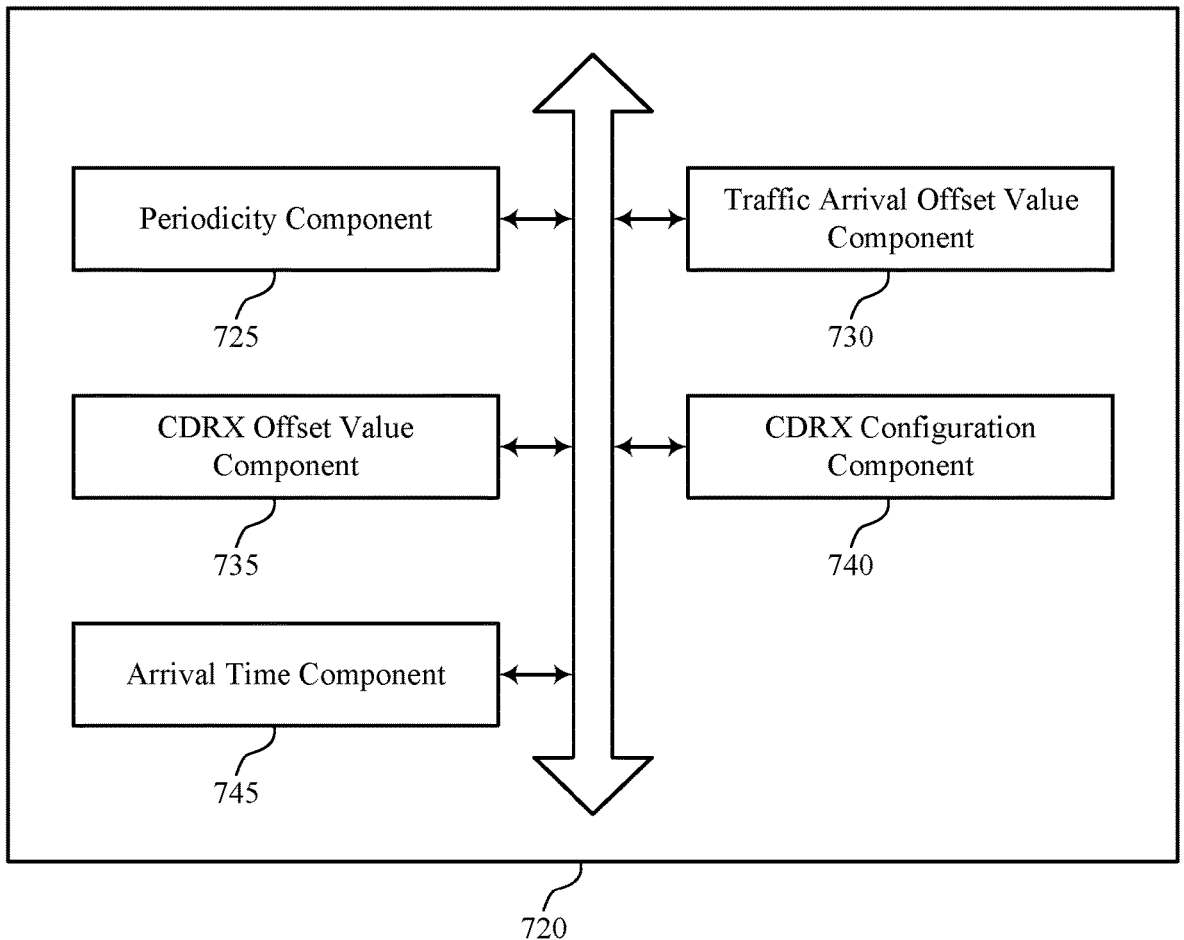
FIG. 7 shows a block diagram of a communications manager that supports CDRX settings for periodic traffic with jitter in accordance with one or more aspects of the present disclosure.

FIG. 7 shows a block diagram 700 of a communications manager 720 that supports CDRX settings for periodic traffic with jitter in accordance with one or more aspects of the present disclosure. The communications manager 720 may be an example of aspects of a communications manager 520, a communications manager 620, or both, as described herein. The communications manager 720, or various components thereof, may be an example of means for performing various aspects of CDRX settings for periodic traffic with jitter as described herein. For example, the communications manager 720 may include a periodicity component 725, a traffic arrival offset value component 730, a CDRX offset value component 735, a CDRX configuration component 740, an arrival time component 745, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a network entity in accordance with examples as disclosed herein. The periodicity component 725 may be configured as or otherwise support a means for determining a traffic periodicity associated with one or more packets of a traffic burst based on a timing parameter associated with the one or more packets of the traffic burst. The traffic arrival offset value component 730 may be configured as or otherwise support a means for estimating a traffic arrival offset value based on the traffic periodicity, an estimated arrival time associated with the one or more packets of the traffic burst, and at least one jitter parameter. The CDRX offset value component 735 may be configured as or otherwise support a means for selecting a CDRX offset value based on the estimated traffic arrival offset value. The CDRX configuration component 740 may be configured as or otherwise support a means for transmitting, to a UE, a message indicating the CDRX offset value for the UE to operate in a CDRX mode according to the CDRX offset value.

In some examples, the arrival time component 745 may be configured as or otherwise support a means for determining the estimated arrival time associated with the one or more packets of the traffic burst based on a set of traffic bursts, a quantity of traffic bursts of the set of traffic bursts, a first arrival time for a first traffic burst of the set of traffic bursts, the traffic periodicity, or a combination thereof.

In some examples, to support estimating the traffic arrival offset value, the traffic arrival offset value component 730 may be configured as or otherwise support a means for estimating the traffic arrival offset value based on the earliest arrival time and an arrival time of the one or more packets of the traffic burst.

In some examples, to support estimating the traffic arrival offset value, the traffic arrival offset value component 730 may be configured as or otherwise support a means for estimating the traffic arrival offset value based on the earliest arrival time, the percentage value, and an arrival time of the one or more packets of the traffic burst.

In some examples, the percentage value of the estimated arrival time is based on a quality of service for a communication link between the network entity and the UE, a packet delay budget, or a combination thereof.

In some examples, to support estimating the traffic arrival offset value, the traffic arrival offset value component 730 may be configured as or otherwise support a means for estimating the traffic arrival offset value based on the at least one jitter parameter and a set of estimated arrival times for a set of traffic bursts including the traffic burst.

In some examples, the at least one jitter parameter includes a set of earliest arrival times associated with the set of traffic bursts. In some examples, the at least one jitter parameter includes a set of earliest arrival times associated with the set of traffic bursts and a percentage value of a difference between respective estimated arrival times associated with each traffic burst and respective nominal arrival times associated with each traffic burst for the set of traffic bursts.

In some examples, the traffic arrival offset value component 730 may be configured as or otherwise support a means for updating the estimated traffic arrival offset value based on a second set of estimated arrival times for a second set of traffic bursts. In some examples, the CDRX offset value component 735 may be configured as or otherwise support a means for updating the CDRX offset value based on the estimated traffic arrival offset value.

In some examples, the CDRX configuration component 740 may be configured as or otherwise support a means for transmitting, to the UE, a second message indicating the updated CDRX offset value. In some examples, the CDRX configuration component 740 may be configured as or otherwise support a means for transmitting the second message based on a difference between the CDRX offset value and the updated CDRX offset value satisfying a threshold. In some examples, the second message includes an RRC message, a MAC-CE, or a wake-up signal for the UE.

In some examples, to support selecting the CDRX offset value, the CDRX offset value component 735 may be configured as or otherwise support a means for selecting the CDRX offset value to be equal to the estimated traffic arrival offset value plus a UE specific offset. In some examples, the UE specific offset is based on scheduling the traffic burst for the UE.

In some examples, to support selecting the CDRX value, the CDRX offset value component 735 may be configured as or otherwise support a means for selecting the CDRX offset value to be equal to the estimated traffic arrival offset value.

In some examples, the CDRX configuration component 740 may be configured as or otherwise support a means for selecting a CDRX duty cycle periodicity to be equal to the determined traffic periodicity. In some examples, the CDRX configuration component 740 may be configured as or otherwise support a means for transmitting, in the message, an indication of the CDRX duty cycle periodicity.

In some examples, to support transmitting the message indicating the CDRX offset value, the CDRX configuration component 740 may be configured as or otherwise support a means for transmitting an indication of a set of CDRX parameters of a CDRX configuration for the CDRX mode, the set of CDRX parameters including the CDRX offset value.

In some examples, the timing parameter includes a rendering fps value or an average downlink traffic arrival time for two or more traffic bursts.

Figure 8:
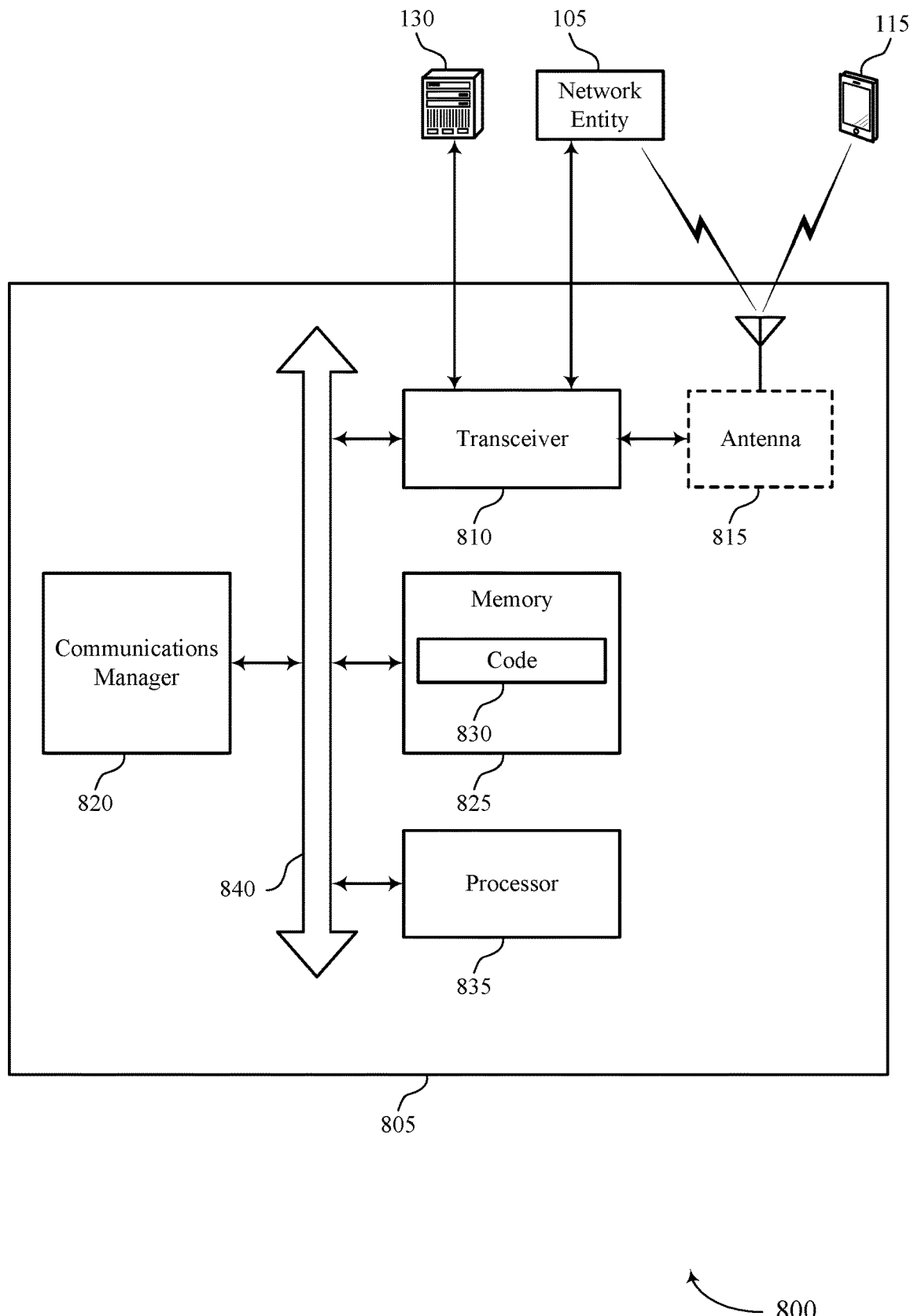
FIG. 8 shows a diagram of a system including a device that supports CDRX settings for periodic traffic with jitter in accordance with one or more aspects of the present disclosure.

FIG. 8 shows a diagram of a system 800 including a device 805 that supports CDRX settings for periodic traffic with jitter in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting CDRX settings for periodic traffic with jitter). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications at a network entity in accordance with examples as disclosed herein. For example, the communications manager 820 may be configured as or otherwise support a means for determining a traffic periodicity associated with one or more packets of a traffic burst based on a timing parameter associated with the one or more packets of the traffic burst. The communications manager 820 may be configured as or otherwise support a means for estimating a traffic arrival offset value based on the traffic periodicity, an estimated arrival time associated with the one or more packets of the traffic burst, and at least one jitter parameter. The communications manager 820 may be configured as or otherwise support a means for selecting a CDRX (CDRX) offset value based on the estimated traffic arrival offset value. The communications manager 820 may be configured as or otherwise support a means for transmitting, to a UE, a message indicating the CDRX offset value for the UE to operate in a CDRX mode according to the CDRX offset value.

By including or configuring the communications manager 820 in accordance with examples as described herein, the device 805 may support techniques for adaptively setting CDRX configuration parameters based on traffic patterns. For example, setting a CDRX offset value based on estimated traffic arrival times may improve efficiency in scheduling and utilization of communication resources, reduce latency, and reduce processing at the device 805. Further, the CDRX offset value may enable improved coordination between the device 805 and other devices, such as XR devices, which may improve user experience.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of CDRX settings for periodic traffic with jitter as described herein, or the processor 835 and the memory 825 may be otherwise configured to perform or support such operations.

Figure 9:
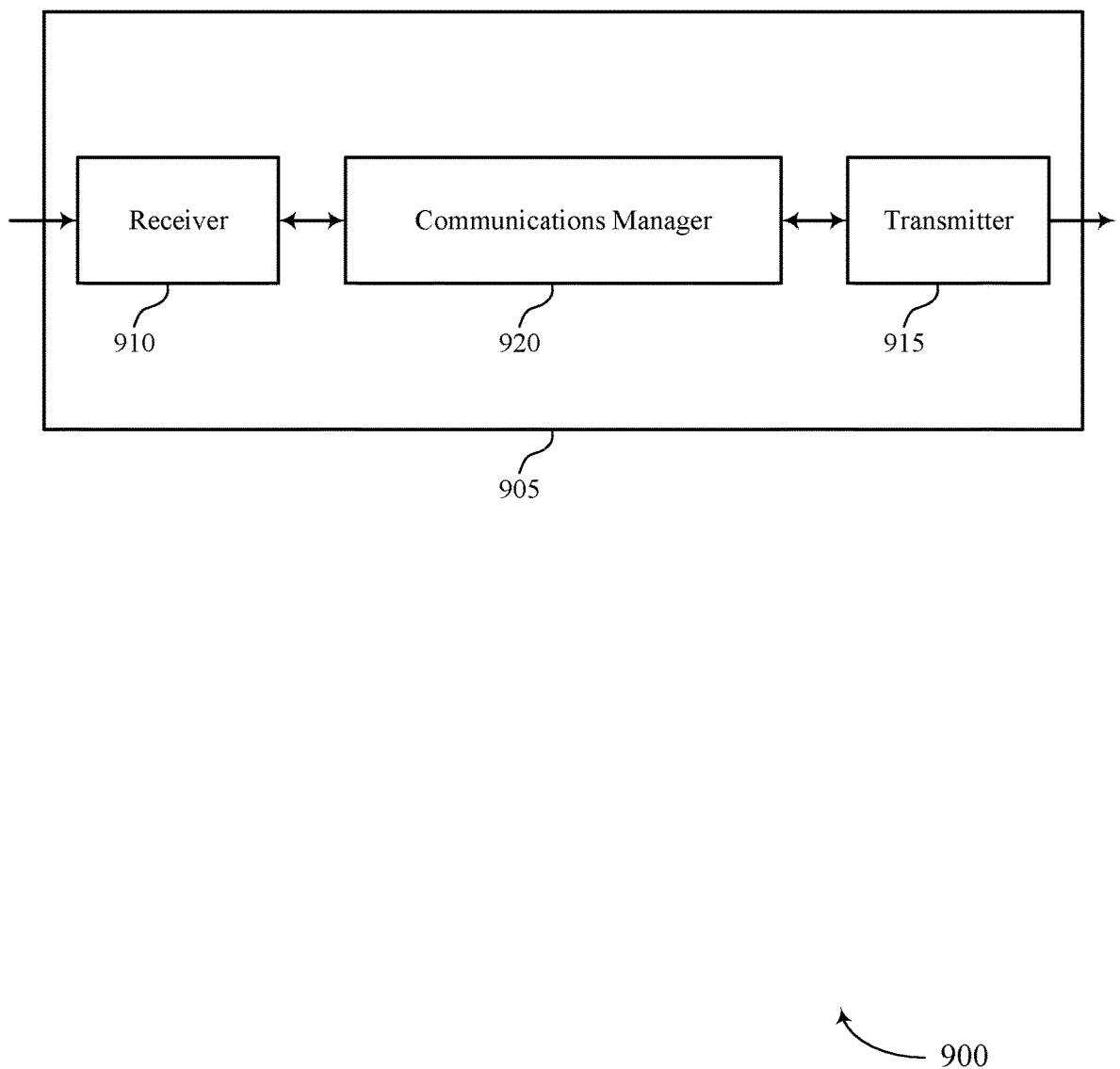
FIGS. 9 and 10 show block diagrams of devices that support CDRX settings for periodic traffic with jitter in accordance with one or more aspects of the present disclosure.

FIG. 9 shows a block diagram 900 of a device 905 that supports CDRX settings for periodic traffic with jitter in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to CDRX settings for periodic traffic with jitter). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to CDRX settings for periodic traffic with jitter). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of CDRX settings for periodic traffic with jitter as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for determining a traffic periodicity associated with one or more packets of a traffic burst based on a timing parameter associated with the one or more packets of the traffic burst. The communications manager 920 may be configured as or otherwise support a means for estimating a traffic arrival offset value based on the traffic periodicity, an estimated arrival time associated with the one or more packets of the traffic burst, and at least one jitter parameter. The communications manager 920 may be configured as or otherwise support a means for selecting a CDRX (CDRX) offset value based on the estimated traffic arrival offset value. The communications manager 920 may be configured as or otherwise support a means for transmitting, to a network entity, a message indicating the CDRX offset value for the UE to operate in a CDRX mode according to the CDRX offset value.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for operating according to CDRX configuration parameters based on traffic patterns. For example, the device 905 may utilize a CDRX offset value based on estimated traffic arrival times that account for jitter, which may improve efficiency in scheduling and utilization of communication resources, reduce latency, and reduce processing at the device 905.

Figure 10:
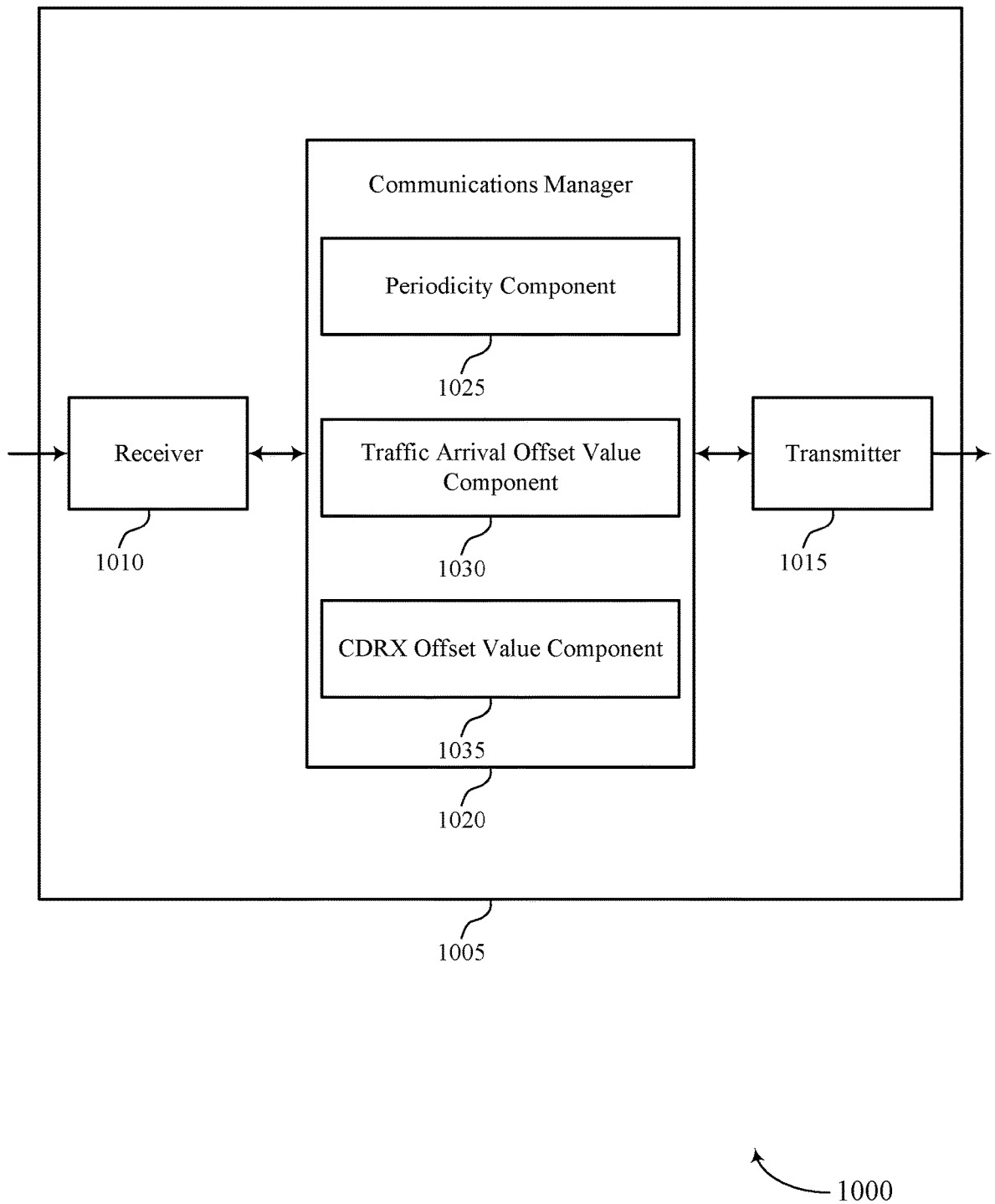

FIG. 10 shows a block diagram 1000 of a device 1005 that supports CDRX settings for periodic traffic with jitter in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to CDRX settings for periodic traffic with jitter). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to CDRX settings for periodic traffic with jitter). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of CDRX settings for periodic traffic with jitter as described herein. For example, the communications manager 1020 may include a periodicity component 1025, a traffic arrival offset value component 1030, a CDRX offset value component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The periodicity component 1025 may be configured as or otherwise support a means for determining a traffic periodicity associated with one or more packets of a traffic burst based on a timing parameter associated with the one or more packets of the traffic burst. The traffic arrival offset value component 1030 may be configured as or otherwise support a means for estimating a traffic arrival offset value based on the traffic periodicity, an estimated arrival time associated with the one or more packets of the traffic burst, and at least one jitter parameter. The CDRX offset value component 1035 may be configured as or otherwise support a means for selecting a CDRX offset value based on the estimated traffic arrival offset value. The CDRX offset value component 1035 may be configured as or otherwise support a means for transmitting, to a network entity, a message indicating the CDRX offset value for the UE to operate in a CDRX mode according to the CDRX offset value.

Figure 11:
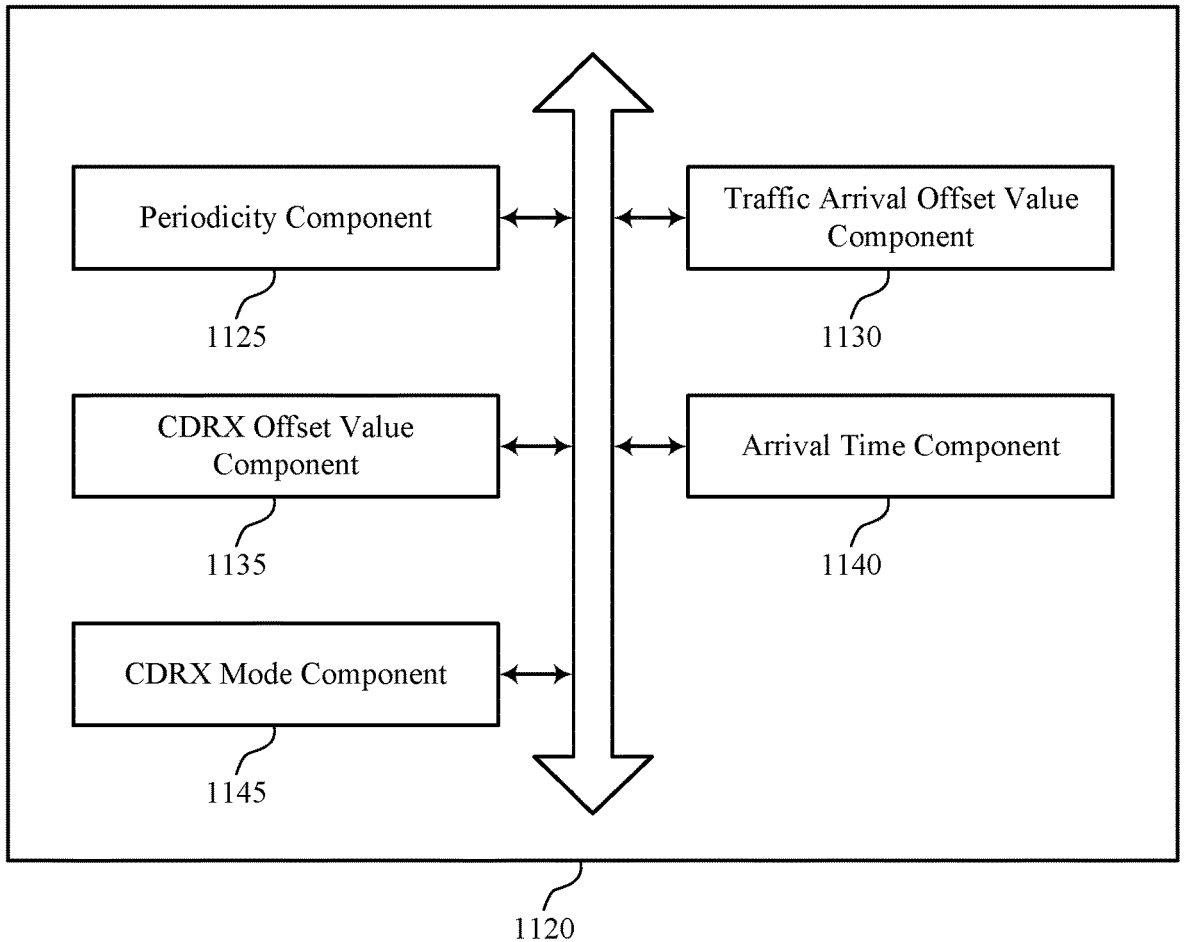
FIG. 11 shows a block diagram of a communications manager that supports CDRX settings for periodic traffic with jitter in accordance with one or more aspects of the present disclosure.

FIG. 11 shows a block diagram 1100 of a communications manager 1120 that supports CDRX settings for periodic traffic with jitter in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of CDRX settings for periodic traffic with jitter as described herein. For example, the communications manager 1120 may include a periodicity component 1125, a traffic arrival offset value component 1130, a CDRX offset value component 1135, an arrival time component 1140, a CDRX mode component 1145, or any combination thereof. Each of these components may communicate, directly or indirectly, with one another (e.g., via one or more buses).

The communications manager 1120 may support wireless communication at a UE in accordance with examples as disclosed herein. The periodicity component 1125 may be configured as or otherwise support a means for determining a traffic periodicity associated with one or more packets of a traffic burst based on a timing parameter associated with the one or more packets of the traffic burst. The traffic arrival offset value component 1130 may be configured as or otherwise support a means for estimating a traffic arrival offset value based on the traffic periodicity, an estimated arrival time associated with the one or more packets of the traffic burst, and at least one jitter parameter. The CDRX offset value component 1135 may be configured as or otherwise support a means for selecting a CDRX offset value based on the estimated traffic arrival offset value. In some examples, the CDRX offset value component 1135 may be configured as or otherwise support a means for transmitting, to a network entity, a message indicating the CDRX offset value for the UE to operate in a CDRX mode according to the CDRX offset value.

In some examples, the arrival time component 1140 may be configured as or otherwise support a means for determining the estimated arrival time associated with the one or more packets of the traffic burst based on a set of traffic bursts, a quantity of traffic bursts of the set of traffic bursts, a first arrival time for a first traffic burst of the set of traffic bursts, and the traffic periodicity.

In some examples, the estimated arrival time, the estimated traffic arrival offset value, and the traffic periodicity are associated with an arrival of the one or more packets of the traffic burst at a server.

In some examples, to support estimating the traffic arrival offset value, the traffic arrival offset value component 1130 may be configured as or otherwise support a means for estimating the traffic arrival offset value based on the earliest arrival time and an arrival time of the one or more packets of the traffic burst.

In some examples, to support estimating the traffic arrival offset value, the traffic arrival offset value component 1130 may be configured as or otherwise support a means for estimating the traffic arrival offset value based on the earliest arrival time, the percentage value, and an arrival time of the one or more packets of the traffic burst. In some examples, the percentage value is based on a quality of service for a communication link between the network entity and the UE, a packet delay budget, or a combination thereof.

In some examples, to support estimating the traffic arrival offset value, the traffic arrival offset value component 1130 may be configured as or otherwise support a means for estimating the traffic arrival offset value based on the at least one jitter parameter and a set of estimated arrival times for a set of traffic bursts including the traffic burst. In some examples, the at least one jitter parameter includes a set of earliest arrival times associated with the set of traffic bursts. In some examples, the at least one jitter parameter includes a set of earliest arrival times associated with the set of traffic bursts and a percentage value of a difference between respective estimated arrival times associated with each traffic burst and respective nominal arrival times associated with each traffic burst for the set of traffic bursts.

In some examples, the CDRX offset value component 1135 may be configured as or otherwise support a means for receiving a second message indicating an updated CDRX offset value. In some examples, the CDRX mode component 1145 may be configured as or otherwise support a means for operating in the CDRX mode according to the updated CDRX offset value. In some examples, the second message includes an RRC message, a MAC-CE, or a wake-up signal for the UE.

In some examples, to support selecting the CDRX offset value, the CDRX offset value component 1135 may be configured as or otherwise support a means for selecting the CDRX offset value to be equal to the estimated traffic arrival offset value.

In some examples, the CDRX mode component 1145 may be configured as or otherwise support a means for operating in the CDRX mode according to a CDRX duty cycle periodicity that is equal to the determined traffic periodicity.

In some examples, the CDRX mode component 1145 may be configured as or otherwise support a means for receiving an indication of a set of CDRX parameters of a CDRX configuration for the CDRX mode, the set of CDRX parameters including the CDRX offset value.

In some examples, the timing parameter includes a rendering fps value or an average downlink traffic arrival time for two or more traffic bursts.

Figure 12:
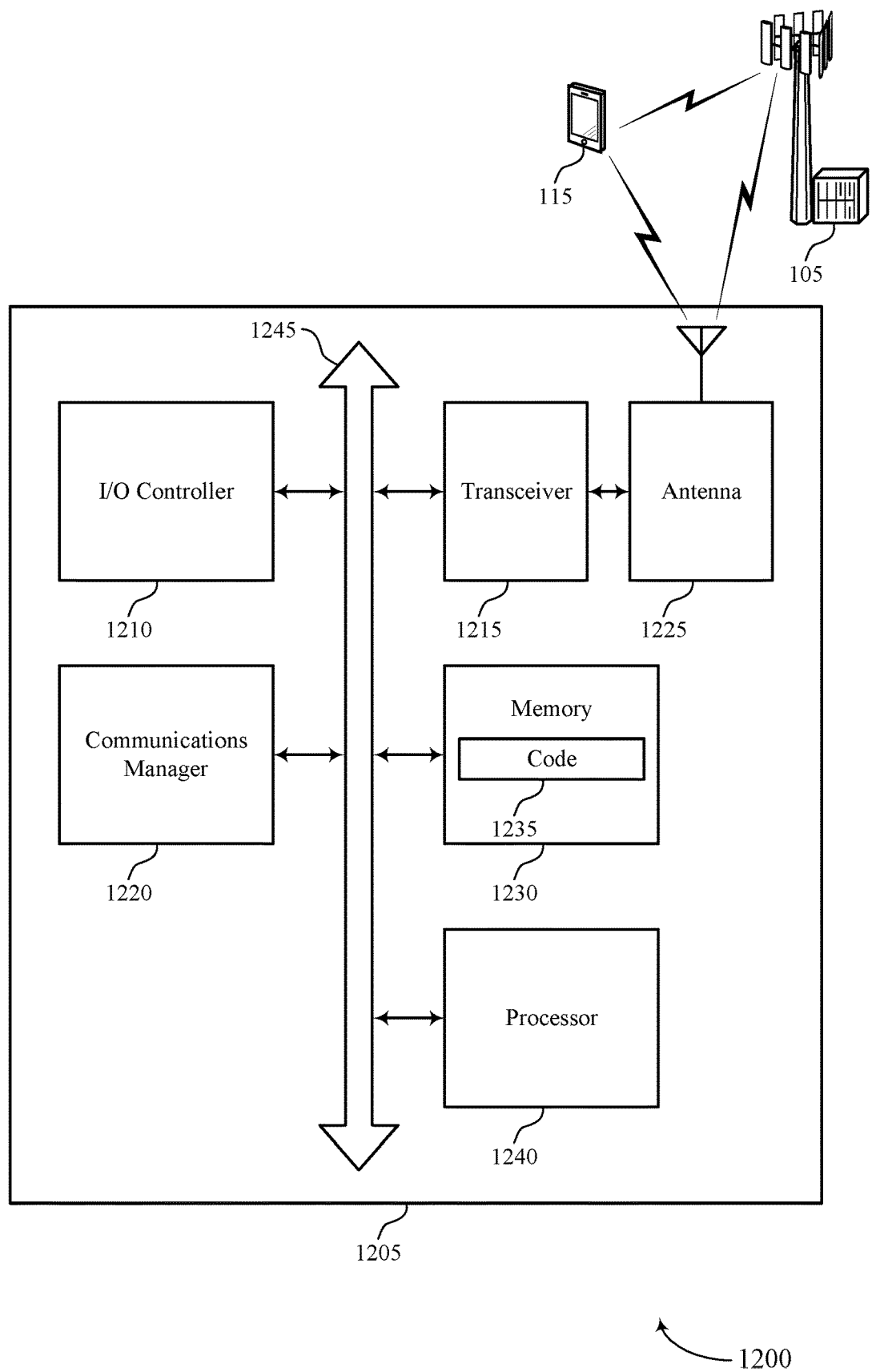
FIG. 12 shows a diagram of a system including a device that supports CDRX settings for periodic traffic with jitter in accordance with one or more aspects of the present disclosure.

FIG. 12 shows a diagram of a system 1200 including a device 1205 that supports CDRX settings for periodic traffic with jitter in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting CDRX settings for periodic traffic with jitter). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for determining a traffic periodicity associated with one or more packets of a traffic burst based on a timing parameter associated with the one or more packets of the traffic burst. The communications manager 1220 may be configured as or otherwise support a means for estimating a traffic arrival offset value based on the traffic periodicity, an estimated arrival time associated with the one or more packets of the traffic burst, and at least one jitter parameter. The communications manager 1220 may be configured as or otherwise support a means for selecting a CDRX offset value based on the estimated traffic arrival offset value. The communications manager 1220 may be configured as or otherwise support a means for transmitting, to a network entity, a message indicating the CDRX offset value for the UE to operate in a CDRX mode according to the CDRX offset value.

By including or configuring the communications manager 1220 in accordance with examples as described herein, the device 1205 may support techniques for operating according to CDRX configuration parameters based on traffic patterns. For example, the device 1205 may utilize a CDRX offset value based on estimated traffic arrival times that account for jitter, which may improve efficiency in scheduling and utilization of communication resources, reduce latency, and reduce power consumption at the device 1205. Further, the CDRX offset value may enable improved coordination between the device 1205 and an XR server, which may improve user experience at the device 1205.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of CDRX settings for periodic traffic with jitter as described herein, or the processor 1240 and the memory 1230 may be otherwise configured to perform or support such operations.

Figure 13:
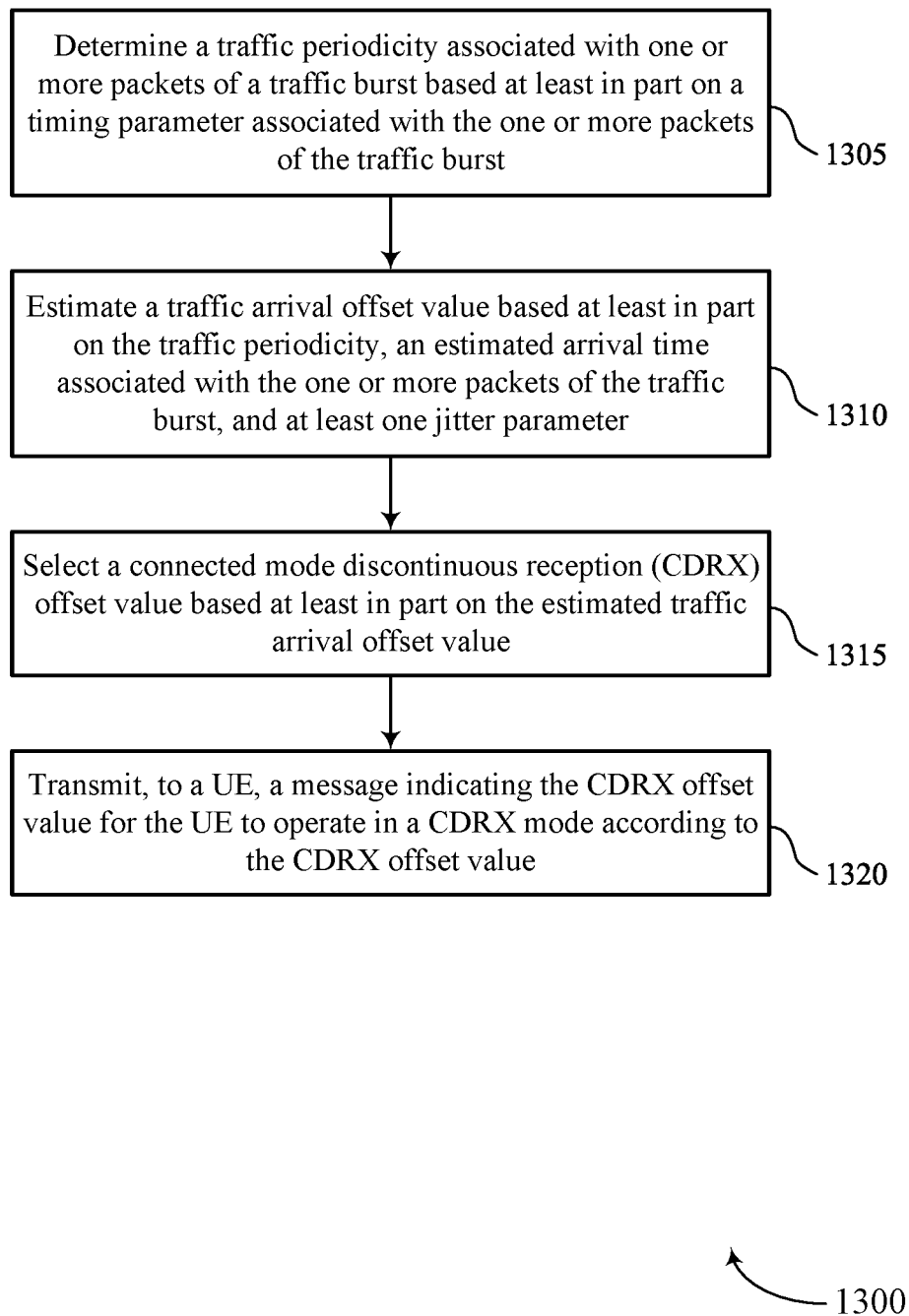
FIGS. 13 through 16 show flowcharts illustrating methods that support CDRX settings for periodic traffic with jitter in accordance with one or more aspects of the present disclosure.

FIG. 13 shows a flowchart illustrating a method 1300 that supports CDRX settings for periodic traffic with jitter in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include determining a traffic periodicity associated with one or more packets of a traffic burst based at least in part on a timing parameter associated with the one or more packets of the traffic burst. The operations of 1305 may be performed in accordance with examples as disclosed herein. In some examples, aspects of the operations of 1305 may be performed by a periodicity component 725 as described with reference to FIG. 7.

At 1310, the method may include estimating a traffic arrival offset value based at least in part on the traffic periodicity, an estimated arrival time associated with the one or more packets of the traffic burst, and at least one jitter parameter. The operations of 1310 may be performed in accordance with examples as disclosed herein. In some examples, aspects of the operations of 1310 may be performed by a traffic arrival offset value component 730 as described with reference to FIG. 7.

At 1315, the method may include selecting a CDRX offset value based at least in part on the estimated traffic arrival offset value. The operations of 1315 may be performed in accordance with examples as disclosed herein. In some examples, aspects of the operations of 1315 may be performed by a CDRX offset value component 735 as described with reference to FIG. 7.

At 1320, the method may include transmitting, to a UE, a message indicating the CDRX offset value for the UE to operate in a CDRX mode according to the CDRX offset value. The operations of 1320 may be performed in accordance with examples as disclosed herein. In some examples, aspects of the operations of 1320 may be performed by a CDRX configuration component 740 as described with reference to FIG. 7.

Figure 14:
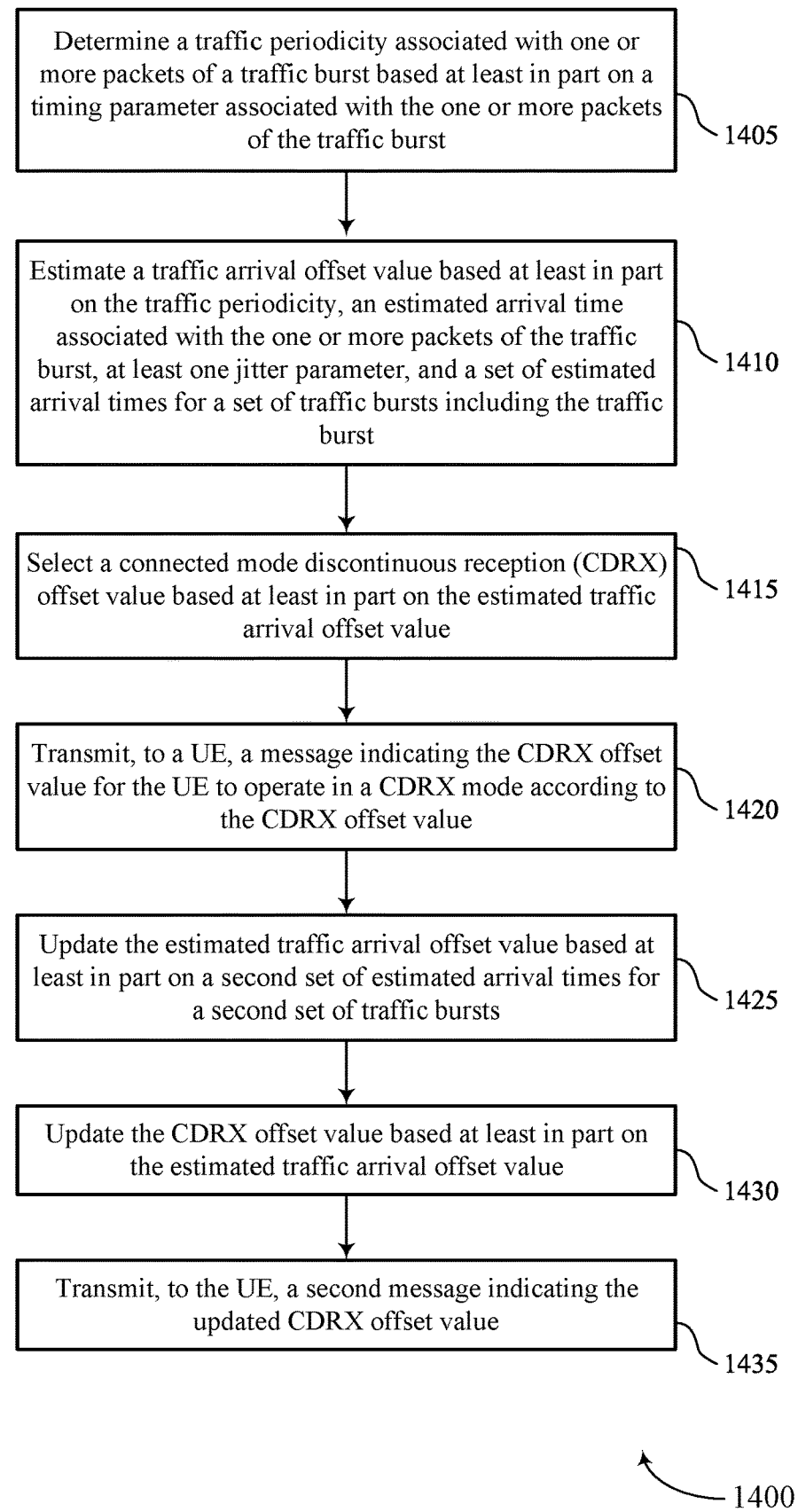

FIG. 14 shows a flowchart illustrating a method 1400 that supports CDRX settings for periodic traffic with jitter in accordance with one or more aspects of the present disclosure. The operations of the method 1400 may be implemented by a network entity or its components as described herein. For example, the operations of the method 1400 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1405, the method may include determining a traffic periodicity associated with one or more packets of a traffic burst based at least in part on a timing parameter associated with the one or more packets of the traffic burst. The operations of 1405 may be performed in accordance with examples as disclosed herein. In some examples, aspects of the operations of 1405 may be performed by a periodicity component 725 as described with reference to FIG. 7.

At 1410, the method may include estimating a traffic arrival offset value based at least in part on the traffic periodicity, an estimated arrival time associated with the one or more packets of the traffic burst, at least one jitter parameter, and a set of estimated arrival times for a set of traffic bursts including the traffic burst. The operations of 1410 may be performed in accordance with examples as disclosed herein. In some examples, aspects of the operations of 1410 may be performed by a traffic arrival offset value component 730 as described with reference to FIG. 7.

At 1415, the method may include selecting a CDRX offset value based at least in part on the estimated traffic arrival offset value. The operations of 1415 may be performed in accordance with examples as disclosed herein. In some examples, aspects of the operations of 1415 may be performed by a CDRX offset value component 735 as described with reference to FIG. 7.

At 1420, the method may include transmitting, to a UE, a message indicating the CDRX offset value for the UE to operate in a CDRX mode according to the CDRX offset value. The operations of 1420 may be performed in accordance with examples as disclosed herein. In some examples, aspects of the operations of 1420 may be performed by a CDRX configuration component 740 as described with reference to FIG. 7.

At 1425, the method may include updating the estimated traffic arrival offset value based at least in part on a second set of estimated arrival times for a second set of traffic bursts. The operations of 1425 may be performed in accordance with examples as disclosed herein. In some examples, aspects of the operations of 1425 may be performed by a traffic arrival offset value component 730 as described with reference to FIG. 7.

At 1430, the method may include updating the CDRX offset value based at least in part on the estimated traffic arrival offset value. The operations of 1430 may be performed in accordance with examples as disclosed herein. In some examples, aspects of the operations of 1430 may be performed by a CDRX offset value component 735 as described with reference to FIG. 7.

At 1435, the method may include transmitting, to the UE, a second message indicating the updated CDRX offset value. The operations of 1435 may be performed in accordance with examples as disclosed herein. In some examples, aspects of the operations of 1435 may be performed by a CDRX configuration component 740 as described with reference to FIG. 7.

Figure 15:
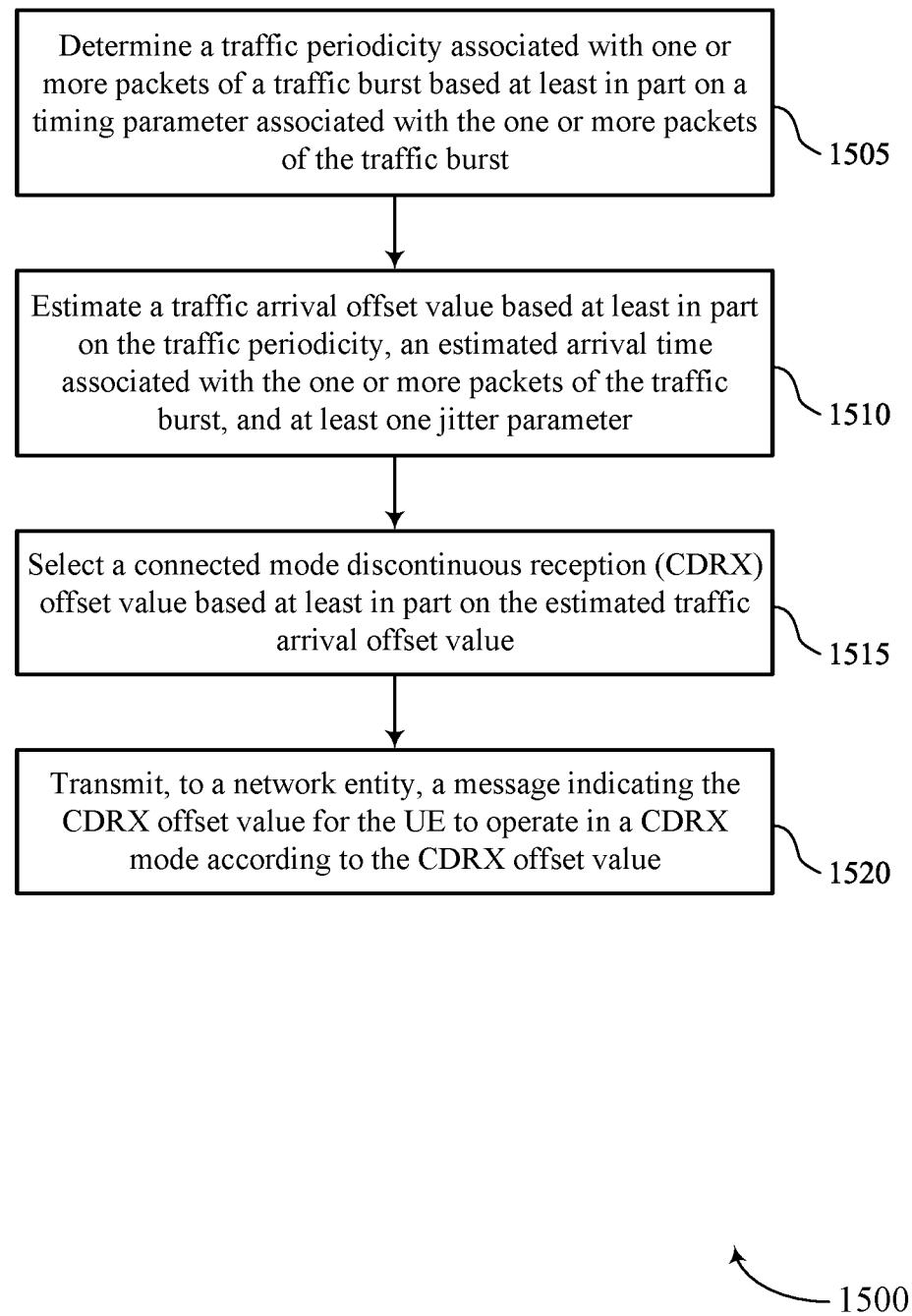

FIG. 15 shows a flowchart illustrating a method 1500 that supports CDRX settings for periodic traffic with jitter in accordance with one or more aspects of the present disclosure. The operations of the method 1500 may be implemented by a UE or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1505, the method may include determining a traffic periodicity associated with one or more packets of a traffic burst based at least in part on a timing parameter associated with the one or more packets of the traffic burst. The operations of 1505 may be performed in accordance with examples as disclosed herein. In some examples, aspects of the operations of 1505 may be performed by a periodicity component 1125 as described with reference to FIG. 11.

At 1510, the method may include estimating a traffic arrival offset value based at least in part on the traffic periodicity, an estimated arrival time associated with the one or more packets of the traffic burst, and at least one jitter parameter. The operations of 1510 may be performed in accordance with examples as disclosed herein. In some examples, aspects of the operations of 1510 may be performed by a traffic arrival offset value component 1130 as described with reference to FIG. 11.

At 1515, the method may include selecting a CDRX offset value based at least in part on the estimated traffic arrival offset value. The operations of 1515 may be performed in accordance with examples as disclosed herein. In some examples, aspects of the operations of 1515 may be performed by a CDRX offset value component 1135 as described with reference to FIG. 11.

At 1520, the method may include transmitting, to a network entity, a message indicating the CDRX offset value for the UE to operate in a CDRX mode according to the CDRX offset value. The operations of 1520 may be performed in accordance with examples as disclosed herein. In some examples, aspects of the operations of 1520 may be performed by a CDRX offset value component 1135 as described with reference to FIG. 11.

Figure 16:
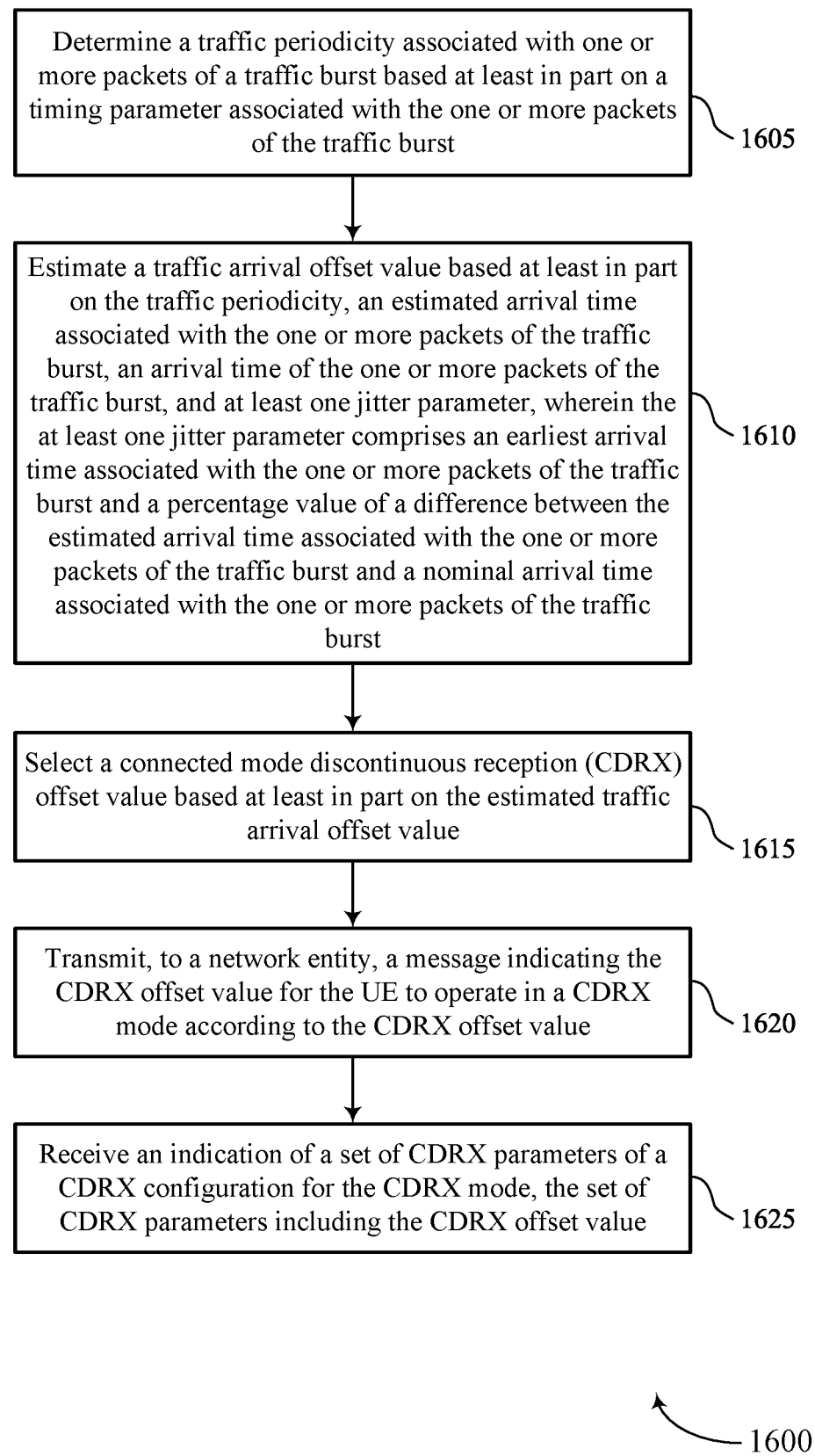

FIG. 16 shows a flowchart illustrating a method 1600 that supports CDRX settings for periodic traffic with jitter in accordance with one or more aspects of the present disclosure. The operations of the method 1600 may be implemented by a UE or its components as described herein. For example, the operations of the method 1600 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1605, the method may include determining a traffic periodicity associated with one or more packets of a traffic burst based at least in part on a timing parameter associated with the one or more packets of the traffic burst. The operations of 1605 may be performed in accordance with examples as disclosed herein. In some examples, aspects of the operations of 1605 may be performed by a periodicity component 1125 as described with reference to FIG. 11.

At 1610, the method may include estimating a traffic arrival offset value based at least in part on the traffic periodicity, an estimated arrival time associated with the one or more packets of the traffic burst, and at least one jitter parameter, where the at least one jitter parameter comprises an earliest arrival time associated with the one or more packets of the traffic burst and a percentage value of a difference between the estimated arrival time and a nominal arrival time associated with the one or more packets of the traffic burst. The operations of 1610 may be performed in accordance with examples as disclosed herein. In some examples, aspects of the operations of 1610 may be performed by a traffic arrival offset value component 1130 as described with reference to FIG. 11.

At 1615, the method may include selecting a CDRX offset value based at least in part on the estimated traffic arrival offset value. The operations of 1615 may be performed in accordance with examples as disclosed herein. In some examples, aspects of the operations of 1615 may be performed by a CDRX offset value component 1135 as described with reference to FIG. 11.

At 1620, the method may include transmitting, to a network entity, a message indicating the CDRX offset value for the UE to operate in a CDRX mode according to the CDRX offset value. The operations of 1620 may be performed in accordance with examples as disclosed herein. In some examples, aspects of the operations of 1620 may be performed by a CDRX offset value component 1135 as described with reference to FIG. 11.

At 1625, the method may include receiving an indication of a set of CDRX parameters of a CDRX configuration for the CDRX mode, the set of CDRX parameters including the CDRX offset value. The operations of 1625 may be performed in accordance with examples as disclosed herein. In some examples, aspects of the operations of 1625 may be performed by a CDRX mode component 1145 as described with reference to FIG. 11.

The following provides an overview of aspects of the present disclosure:

Aspect 1: A method for wireless communications at a network entity, comprising: determining a traffic periodicity associated with one or more packets of a traffic burst based at least in part on a timing parameter associated with the one or more packets of the traffic burst; estimating a traffic arrival offset value based at least in part on the traffic periodicity, an estimated arrival time associated with the one or more packets of the traffic burst, and at least one jitter parameter; selecting a CDRX offset value based at least in part on the estimated traffic arrival offset value; and transmitting, to a UE, a message indicating the CDRX offset value for the UE to operate in a CDRX mode according to the CDRX offset value.

Aspect 2: The method of aspect 1, further comprising: determining the estimated arrival time associated with the one or more packets of the traffic burst based at least in part on a set of traffic bursts, a quantity of traffic bursts of the set of traffic bursts, a first arrival time for a first traffic burst of the set of traffic bursts, the traffic periodicity, or a combination thereof.

Aspect 3: The method of any of aspects 1 through 2, wherein the at least one jitter parameter comprises an earliest arrival time associated with the one or more packets of the traffic burst, and wherein estimating the traffic arrival offset value comprises: estimating the traffic arrival offset value based at least in part on the earliest arrival time and an arrival time of the one or more packets of the traffic burst.

Aspect 4: The method of any of aspects 1 through 2, wherein the at least one jitter parameter comprises an earliest arrival time associated with the one or more packets of the traffic burst and a percentage value of a difference between the estimated arrival time associated with the one or more packets of the traffic burst and a nominal arrival time associated with the one or more packets of the traffic burst, and wherein estimating the traffic arrival offset value comprises: estimating the traffic arrival offset value based at least in part on the earliest arrival time, the percentage value, and an arrival time of the one or more packets of the traffic burst.

Aspect 5: The method of aspect 4, wherein the percentage value is based at least in part on a quality of service for a communication link between the network entity and the UE, a packet delay budget, or a combination thereof.

Aspect 6: The method of any of aspects 1 through 2, wherein estimating the traffic arrival offset value comprises: estimating the traffic arrival offset value based at least in part on the at least one jitter parameter and a set of estimated arrival times for a set of traffic bursts including the traffic burst.

Aspect 7: The method of aspect 6, wherein the at least one jitter parameter comprises a set of earliest arrival times associated with the set of traffic bursts.

Aspect 8: The method of aspect 6, wherein the at least one jitter parameter comprises a set of earliest arrival times associated with the set of traffic bursts and a percentage value of a difference between the set of estimated arrival times and a set of nominal arrival times for the set of traffic bursts.

Aspect 9: The method of any of aspects 6 through 8, further comprising: updating the estimated traffic arrival offset value based at least in part on a second set of estimated arrival times for a second set of traffic bursts; and updating the CDRX offset value based at least in part on the estimated traffic arrival offset value.

Aspect 10: The method of aspect 9, further comprising: transmitting, to the UE, a second message indicating the updated CDRX offset value.

Aspect 11: The method of aspect 10, further comprising: transmitting the second message based at least in part on a difference between the CDRX offset value and the updated CDRX offset value satisfying a threshold.

Aspect 12: The method of any of aspects 10 through 11, wherein the second message comprises an RRC message, a MAC-CE, or a wake-up signal for the UE.

Aspect 13: The method of any of aspects 1 through 12, wherein selecting the CDRX offset value comprises: selecting the CDRX offset value to be equal to the estimated traffic arrival offset value plus a UE specific offset.

Aspect 14: The method of aspect 13, wherein the UE specific offset is based at least in part on scheduling the traffic burst for the UE.

Aspect 15: The method of any of aspects 1 through 14, wherein selecting the CDRX value comprises: selecting the CDRX offset value to be equal to the estimated traffic arrival offset value.

Aspect 16: The method of any of aspects 1 through 15, further comprising: selecting a CDRX duty cycle periodicity to be equal to the determined traffic periodicity; and transmitting, in the message, an indication of the CDRX duty cycle periodicity.

Aspect 17: The method of any of aspects 1 through 16, wherein transmitting the message indicating the CDRX offset value further comprises: transmitting an indication of a set of CDRX parameters of a CDRX configuration for the CDRX mode, the set of CDRX parameters including the CDRX offset value.

Aspect 18: The method of any of aspects 1 through 17, wherein the timing parameter comprises a rendering frames per second value or an average downlink traffic arrival time for two or more traffic bursts.

Aspect 19: A method for wireless communication at a UE, comprising: determining a traffic periodicity associated with one or more packets of a traffic burst based at least in part on a timing parameter associated with the one or more packets of the traffic burst; estimating a traffic arrival offset value based at least in part on the traffic periodicity, an estimated arrival time associated with the one or more packets of the traffic burst, and at least one jitter parameter; selecting a CDRX offset value based at least in part on the estimated traffic arrival offset value; and transmitting, to a network entity, a message indicating the CDRX offset value for the UE to operate in a CDRX mode according to the CDRX offset value.

Aspect 20: The method of aspect 19, further comprising: determining the estimated arrival time associated with the one or more packets of the traffic burst based at least in part on a set of traffic bursts, a quantity of traffic bursts of the set of traffic bursts, a first arrival time for a first traffic burst of the set of traffic bursts, and the traffic periodicity.

Aspect 21: The method of any of aspects 19 through 20, wherein the estimated arrival time, the estimated traffic arrival offset value, and the traffic periodicity are associated with an arrival of the one or more packets of the traffic burst at a server.

Aspect 22: The method of any of aspects 19 through 21, wherein the at least one jitter parameter comprises an earliest arrival time associated with the one or more packets of the traffic burst, and wherein estimating the traffic arrival offset value comprises: estimating the traffic arrival offset value based at least in part on the earliest arrival time and an arrival time of the one or more packets of the traffic burst.

Aspect 23: The method of any of aspects 19 through 21, wherein the at least one jitter parameter comprises an earliest arrival time associated with the one or more packets of the traffic burst and a percentage value of a difference between the estimated arrival time associated with the one or more packets of the traffic burst and a nominal arrival time associated with the one or more packets of the traffic burst, and wherein estimating the traffic arrival offset value comprises: estimating the traffic arrival offset value based at least in part on the earliest arrival time, the percentage value, and an arrival time of the one or more packets of the traffic burst.

Aspect 24: The method of aspect 23, wherein the percentage value is based at least in part on a quality of service for a communication link between the network entity and the UE, a packet delay budget, or a combination thereof.

Aspect 25: The method of any of aspects 19 through 21, wherein estimating the traffic arrival offset value comprises: estimating the traffic arrival offset value based at least in part on the at least one jitter parameter and a set of estimated arrival times for a set of traffic bursts including the traffic burst.

Aspect 26: The method of aspect 25, wherein the at least one jitter parameter comprises a set of earliest arrival times associated with the set of traffic bursts.

Aspect 27: The method of aspect 25, wherein the at least one jitter parameter comprises a set of earliest arrival times associated with the set of traffic bursts and a percentage value of a difference between the set of estimated arrival times and a set of nominal arrival times for the set of traffic bursts.

Aspect 28: The method of any of aspects 25 through 27, further comprising: receiving a second message indicating an updated CDRX offset value; and operating in the CDRX mode according to the updated CDRX offset value.

Aspect 29: The method of aspect 28, wherein the second message comprises an RRC message, a MAC-CE, or a wake-up signal for the UE.

Aspect 30: The method of any of aspects 19 through 29, wherein selecting the CDRX offset value comprises: selecting the CDRX offset value to be equal to the estimated traffic arrival offset value.

Aspect 31: The method of any of aspects 19 through 30, further comprising: operating in the CDRX mode according to a CDRX duty cycle periodicity that is equal to the determined traffic periodicity.

Aspect 32: The method of any of aspects 19 through 31, further comprising: receiving an indication of a set of CDRX parameters of a CDRX configuration for the CDRX mode, the set of CDRX parameters including the CDRX offset value.

Aspect 33: The method of any of aspects 19 through 32, wherein the timing parameter comprises a rendering frames per second value or an average downlink traffic arrival time for two or more traffic bursts.

Aspect 34: An apparatus for wireless communications at a network entity, comprising at least one processor; memory coupled with the at least one processor; and instructions stored in the memory and executable by the at least one processor to cause the apparatus to perform a method of any of aspects 1 through 18.

Aspect 35: An apparatus for wireless communications at a network entity, comprising at least one means for performing a method of any of aspects 1 through 18.

Aspect 36: A non-transitory computer-readable medium storing code for wireless communications at a network entity, the code comprising instructions executable by at least one processor to perform a method of any of aspects 1 through 18.

Aspect 37: An apparatus for wireless communication at a UE, comprising at least one processor; memory coupled with the at least one processor; and instructions stored in the memory and executable by the at least one processor to cause the apparatus to perform a method of any of aspects 19 through 33.

Aspect 38: An apparatus for wireless communication at a UE, comprising at least one means for performing a method of any of aspects 19 through 33.

Aspect 39: A non-transitory computer-readable medium storing code for wireless communication at a UE, the code comprising instructions executable by at least one processor to perform a method of any of aspects 19 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, including future systems and radio technologies, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), or ascertaining. Also, "determining" can include receiving (e.g., receiving information) or accessing (e.g., accessing data stored in memory). Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a network entity, comprising:
    at least one processor; and
    memory coupled to the at least one processor, the memory storing instructions executable by the at least one processor to cause the network entity to:
        determine a traffic periodicity associated with one or more packets of a traffic burst based at least in part on a timing parameter associated with the one or more packets of the traffic burst;
        estimate a traffic arrival offset value based at least in part on the traffic periodicity, an estimated arrival time associated with the one or more packets of the traffic burst, and at least one jitter parameter, wherein the estimated arrival time is a function of a difference between an actual arrival time associated with the one or more packets of the traffic burst and an expected arrival time associated with the one or more packets of the traffic burst;
        select a connected mode discontinuous reception (CDRX) offset value based at least in part on the estimated traffic arrival offset value; and
        transmit, to a user equipment (UE), a message indicating the CDRX offset value for the UE to operate in a CDRX mode according to the CDRX offset value.

2. The apparatus of claim 1, wherein the instructions are further executable by the at least one processor to cause the network entity to:
    determine the estimated arrival time associated with the one or more packets of the traffic burst based at least in part on a set of traffic bursts, a quantity of traffic bursts of the set of traffic bursts, a first arrival time for a first traffic burst of the set of traffic bursts, the traffic periodicity, or a combination thereof.

3. The apparatus of claim 1, wherein the at least one jitter parameter comprises an earliest arrival time associated with the one or more packets of the traffic burst, and wherein the instructions to estimate the traffic arrival offset value are executable by the at least one processor to cause the network entity to:
    estimate the traffic arrival offset value based at least in part on the earliest arrival time and an arrival time of the one or more packets of the traffic burst.

4. The apparatus of claim 1, wherein the at least one jitter parameter comprises an earliest arrival time associated with the one or more packets of the traffic burst and a percentage value of a difference between the estimated arrival time associated with the one or more packets of the traffic burst and a nominal arrival time associated with the one or more packets of the traffic burst, and wherein the instructions to estimate the traffic arrival offset value are executable by the at least one processor to cause the network entity to:
    estimate the traffic arrival offset value based at least in part on the earliest arrival time, the percentage value, and an arrival time of the one or more packets of the traffic burst.

5. The apparatus of claim 4, wherein the percentage value is based at least in part on a quality of service for a communication link between the network entity and the UE, a packet delay budget, or a combination thereof.

6. The apparatus of claim 1, wherein the instructions to estimate the traffic arrival offset value are executable by the at least one processor to cause the network entity to:
    estimate the traffic arrival offset value based at least in part on the at least one jitter parameter and a set of estimated arrival times for a set of traffic bursts including the traffic burst.

7. The apparatus of claim 6, wherein the at least one jitter parameter comprises a set of earliest arrival times associated with the set of traffic bursts.

8. The apparatus of claim 6, wherein the at least one jitter parameter comprises a set of earliest arrival times associated with the set of traffic bursts and a percentage value of a difference between the set of estimated arrival times and a set of nominal arrival times for the set of traffic bursts.

9. The apparatus of claim 6, wherein the instructions are further executable by the at least one processor to cause the network entity to:
update the estimated traffic arrival offset value based at least in part on a second set of estimated arrival times for a second set of traffic bursts; and
update the CDRX offset value based at least in part on the estimated traffic arrival offset value.

10. The apparatus of claim 9, wherein the instructions are further executable by the at least one processor to cause the network entity to:
transmit, to the UE, a second message indicating the updated CDRX offset value.

11. The apparatus of claim 10, wherein the instructions are further executable by the at least one processor to cause the network entity to:
transmit the second message based at least in part on a difference between the CDRX offset value and the updated CDRX offset value satisfying a threshold.

12. The apparatus of claim 10, wherein the second message comprises a radio resource control (RRC) message, a media access control (MAC) control element (MAC-CE), or a wake-up signal for the UE.

13. The apparatus of claim 1, wherein the instructions to select the CDRX offset value are executable by the at least one processor to cause the network entity to:
select the CDRX offset value to be equal to the estimated traffic arrival offset value plus a UE specific offset.

14. The apparatus of claim 1, wherein the instructions to select the CDRX value are executable by the at least one processor to cause the network entity to:
select the CDRX offset value to be equal to the estimated traffic arrival offset value.

15. The apparatus of claim 1, wherein the instructions are further executable by the at least one processor to cause the network entity to:
select a CDRX duty cycle periodicity to be equal to the determined traffic periodicity; and
transmit, in the message, an indication of the CDRX duty cycle periodicity.

16. The apparatus of claim 1, wherein the instructions to transmit the message indicating the CDRX offset value are further executable by the at least one processor to cause the network entity to:
transmit an indication of a set of CDRX parameters of a CDRX configuration for the CDRX mode, the set of CDRX parameters including the CDRX offset value.

17. The apparatus of claim 1, wherein the timing parameter comprises a rendering frames per second value or an average downlink traffic arrival time for two or more traffic bursts.

18. An apparatus for wireless communication at a user equipment (UE), comprising:
at least one processor; and
memory coupled to the at least one processor, the memory storing instructions executable by the at least one processor to cause the UE to:
determine a traffic periodicity associated with one or more packets of a traffic burst based at least in part on a timing parameter associated with the one or more packets of the traffic burst;
estimate a traffic arrival offset value based at least in part on the traffic periodicity, an estimated arrival time associated with the one or more packets of the traffic burst, and at least one jitter parameter, wherein the estimated arrival time is a function of a difference between an actual arrival time associated with the one or more packets of the traffic burst and an expected arrival time associated with the one or more packets of the traffic burst;
select a connected mode discontinuous reception (CDRX) offset value based at least in part on the estimated traffic arrival offset value; and
transmit, to a network entity, a message indicating the CDRX offset value for the UE to operate in a CDRX mode according to the CDRX offset value.

19. The apparatus of claim 18, wherein the instructions are further executable by the at least one processor to cause the UE to:
determine the estimated arrival time associated with the one or more packets of the traffic burst based at least in part on a set of traffic bursts, a quantity of traffic bursts of the set of traffic bursts, a first arrival time for a first traffic burst of the set of traffic bursts, the traffic periodicity, or a combination thereof.

20. The apparatus of claim 18, wherein the estimated arrival time, the estimated traffic arrival offset value, and the traffic periodicity are associated with an arrival of the one or more packets of the traffic burst at a server.

21. The apparatus of claim 18, wherein the at least one jitter parameter comprises an earliest arrival time associated with the one or more packets of the traffic burst, and wherein the instructions to estimate the traffic arrival offset value are executable by the at least one processor to cause the UE to:
estimate the traffic arrival offset value based at least in part on the earliest arrival time and an arrival time of the one or more packets of the traffic burst.

22. The apparatus of claim 18, wherein the at least one jitter parameter comprises an earliest arrival time associated with the one or more packets of the traffic burst and a percentage value of a difference between the estimated arrival time associated with the one or more packets of the traffic burst and a nominal arrival time associated with the one or more packets of the traffic burst, and wherein the instructions to estimate the traffic arrival offset value are executable by the at least one processor to cause the UE to:
estimate the traffic arrival offset value based at least in part on the earliest arrival time, the percentage value, and an arrival time of the one or more packets of the traffic burst.

23. The apparatus of claim 18, wherein the instructions to estimate the traffic arrival offset value are executable by the at least one processor to cause the UE to:
estimate the traffic arrival offset value based at least in part on the at least one jitter parameter and a set of estimated arrival times for a set of traffic bursts including the traffic burst.

24. The apparatus of claim 23, wherein the instructions are further executable by the at least one processor to cause the UE to:
receive a second message indicating an updated CDRX offset value; and
operate in the CDRX mode according to the updated CDRX offset value.

25. The apparatus of claim 24, wherein the second message comprises a radio resource control (RRC) message, a media access control (MAC) control element (MAC-CE), or a wake-up signal for the UE.

26. The apparatus of claim 18, wherein the instructions to select the CDRX offset value are executable by the at least one processor to cause the UE to:
select the CDRX offset value to be equal to the estimated traffic arrival offset value.

27. The apparatus of claim 18, wherein the instructions are further executable by the at least one processor to cause the UE to:

operate in the CDRX mode according to a CDRX duty cycle periodicity that is equal to the determined traffic periodicity.

28. The apparatus of claim 18, wherein the instructions are further executable by the at least one processor to cause the UE to:

receive an indication of a set of CDRX parameters of a CDRX configuration for the CDRX mode, the set of CDRX parameters including the CDRX offset value.

29. A method for wireless communications at a network entity, comprising:

determining a traffic periodicity associated with one or more packets of a traffic burst based at least in part on a timing parameter associated with the one or more packets of the traffic burst;

estimating a traffic arrival offset value based at least in part on the traffic periodicity, an estimated arrival time associated with the one or more packets of the traffic burst, and at least one jitter parameter, wherein the estimated arrival time is a function of a difference between an actual arrival time associated with the one or more packets of the traffic burst and an expected arrival time associated with the one or more packets of the traffic burst;

selecting a connected mode discontinuous reception (CDRX) offset value based at least in part on the estimated traffic arrival offset value; and transmitting, to a user equipment (UE), a message indicating the CDRX offset value for the UE to operate in a CDRX mode according to the CDRX offset value.

30. A method for wireless communication at a user equipment (UE), comprising:

determining a traffic periodicity associated with one or more packets of a traffic burst based at least in part on a timing parameter associated with the one or more packets of the traffic burst;

estimating a traffic arrival offset value based at least in part on the traffic periodicity, an estimated arrival time associated with the one or more packets of the traffic burst, and at least one jitter parameter, wherein the estimated arrival time is a function of a difference between an actual arrival time associated with the one or more packets of the traffic burst and an expected arrival time associated with the one or more packets of the traffic burst;

selecting a connected mode discontinuous reception (CDRX) offset value based at least in part on the estimated traffic arrival offset value; and transmitting, to a network entity, a message indicating the CDRX offset value for the UE to operate in a CDRX mode according to the CDRX offset value.

* * * * *